United States Patent
Miyachi et al.

(10) Patent No.: US 11,635,660 B2
(45) Date of Patent: Apr. 25, 2023

(54) LIQUID CRYSTAL DISPLAY DEVICE AND MANUFACTURING METHOD THEREFOR

(71) Applicant: JSR CORPORATION, Tokyo (JP)

(72) Inventors: Koichi Miyachi, Tokyo (JP); Yoshihiko Kuroda, Tokyo (JP); Ryuzo Ono, Tokyo (JP); Syunsuke Kawamata, Tokyo (JP)

(73) Assignee: JSR CORPORATION, Tokyo (JP)

( * ) Notice: Subject to any disclaimer, the term of this patent is extended or adjusted under 35 U.S.C. 154(b) by 17 days.

(21) Appl. No.: 17/518,576

(22) Filed: Nov. 3, 2021

(65) Prior Publication Data

US 2022/0057677 A1  Feb. 24, 2022

Related U.S. Application Data

(63) Continuation of application No. PCT/JP2020/015240, filed on Apr. 2, 2020.

(30) Foreign Application Priority Data

May 8, 2019  (JP) .............................. JP2019-088635

(51) Int. Cl.
  *G02F 1/1337* (2006.01)
  *G02F 1/1343* (2006.01)
(52) U.S. Cl.
  CPC .... *G02F 1/133746* (2021.01); *G02F 1/13378* (2013.01); *G02F 1/133711* (2013.01);
  (Continued)
(58) Field of Classification Search
  None
  See application file for complete search history.

(56) References Cited

U.S. PATENT DOCUMENTS

| | | | |
|---|---|---|---|
| 2005/0014924 A1* | 1/2005 | Inaba | C08F 8/30 528/310 |
| 2012/0212697 A1* | 8/2012 | Miyakawa | G02F 1/133711 349/123 |

(Continued)

FOREIGN PATENT DOCUMENTS

| | | |
|---|---|---|
| JP | 2009229894 | 10/2009 |
| JP | 2012173601 | 9/2012 |

(Continued)

OTHER PUBLICATIONS

"International Search Report (Form PCT/ISA/210) of PCT/JP2020/015240", dated Jun. 2, 2020, with English translation thereof, pp. 1-4.

*Primary Examiner* — Phu Vu
(74) *Attorney, Agent, or Firm* — JCIPRNET

(57) ABSTRACT

This liquid crystal display device has a plurality of pixels. Each pixel in the plurality of pixels includes first to fourth alignment regions; these first to fourth alignment regions are arranged in the longitudinal direction of the pixels, and the difference between any two alignment orientations in the first to fourth alignment regions is approximately equal to an integer multiple of 90 degrees. Of the pre-tilt angles defined by a first alignment film and a second alignment film in each of the first to fourth alignment regions, one pre-tilt angle is less than 90 degrees and the other pre-tilt angle is substantially 90 degrees. The optical alignment film is formed using a polymer having an optical alignment group in the side chain, and the content of the optical alignment group in the side chain of the polymer is less than 1.1 mmol/g.

12 Claims, 8 Drawing Sheets

(52) U.S. Cl.
CPC .. *G02F 1/133757* (2021.01); *G02F 1/133761* (2021.01); *G02F 1/134309* (2013.01); *G02F 1/13439* (2013.01)

(56) References Cited

U.S. PATENT DOCUMENTS

2016/0215216 A1* 7/2016 Yoon ................... C09K 19/542
2019/0250466 A1* 8/2019 Yagi ....................... G02F 1/137
2020/0225541 A1* 7/2020 Terashita ............... G02F 1/1396

FOREIGN PATENT DOCUMENTS

| | | |
|---|---|---|
| JP | 5184618 | 4/2013 |
| WO | 2017057210 | 4/2017 |
| WO | 2017217300 | 12/2017 |
| WO | 2019039358 | 2/2019 |

\* cited by examiner

LIQUID CRYSTAL DISPLAY DEVICE AND MANUFACTURING METHOD THEREFOR

CROSS-REFERENCE TO RELATED APPLICATIONS

This application is a continuation application of and claims priority benefit of an international PCT application serial no. PCT/JP2020/015240, filed on Apr. 2, 2020, which claims the priority benefit of Japan application no. 2019-088635, filed on May 8, 2019. The entirety of each of the above-mentioned patent applications is hereby incorporated by reference herein and made a part of this specification.

TECHNICAL FIELD

The present disclosure relates to a liquid crystal display device and a manufacturing method therefor.

BACKGROUND ART

For liquid crystal displays, especially liquid crystal display panels for large TVs, a viewing angle, a transmittance, a response time, and the like are important performance indicators. Various modes such as a 4 domain-reverse twisted nematic (4D-RTN) mode, a polymer sustained alignment (PSA) mode, an in-plane switching (IPS) mode, and a fringe field switching (FFS) mode have been developed as a liquid crystal display mode for improving values of the performance indicators (for example, refer to Patent Literature 1 (Japanese Patent No. 5184618)). At present, large-sized TVs using these liquid crystal display mode technologies are being mass-produced.

In recent years, higher definition 4K (number of pixels 3840×2160) and 8K (number of pixels 7680×4320) have been realized from conventional high-definition systems (number of pixels 1920×1080). However, in a 4K or 8K liquid crystal display panel, a panel transmittance tends to decrease due to an increase in the number of wirings and switching elements. When the panel transmittance decreases, light utilization efficiency of a backlight decreases, and thus it leads to an increase in power consumption.

In order to eliminate such inconvenience, Patent Literature 2 (PCT International Publication No. WO2017/057210) discloses a technology utilizing a 4D-ECB (4 Domain-Electrically Controlled Birefringence) mode for the purpose of improving the transmittance of 4D-RTN using an optical alignment film. In a liquid crystal display device described in Patent Literature 2, four alignment regions in which tilt orientations of liquid crystal molecules are different from each other are disposed in one pixel in a longitudinal direction of the pixel, and when a liquid crystal display panel is seen in a plan view, a twist angle of the liquid crystal molecules is substantially 0 degrees in each of the four alignment regions.

In the liquid crystal display device described in Patent Literature 2, in order to realize a four division alignment within one pixel, it is necessary to perform a division alignment exposure four times for each of a TFT substrate and a facing substrate (a CF substrate) for a total of eight division alignment exposures. Therefore, a throughput in production is reduced as compared with the liquid crystal display device in the 4D-RTN mode.

Further, in the liquid crystal display device described in Patent Literature 2, it is necessary to cause a boundary line of the division alignment exposure in the pixel on the TFT substrate side to coincide with a boundary line of the division alignment exposure in the pixel on the facing substrate side to form four alignment regions. However, it is not easy to cause the boundaries to coincide with each other due to accuracy of positioning, a distortion caused by thermal expansion of the substrate, and the like. In the case that dislocation occurs when both substrates are bonded together, there is a concern that display defects may occur.

The present disclosure provides a liquid crystal display device in which the number of alignment exposures is small, a throughput in production is good, and display quality is excellent.

The present inventors have made diligent studies and have attempted to reduce the number of exposures by setting a pre-tilt angle on one substrate side to less than 90 degrees and a pre-tilt angle on the other substrate side to substantially 90 degrees in manufacture of a liquid crystal cell by optical alignment. However, in the liquid crystal cell in which the pre-tilt angle on one substrate side is set to less than 90 degrees and the pre-tilt angle on the other substrate side is substantially 90 degrees by optical alignment processing, it was found that a residual DC electric field is likely to occur and the uneven distribution of impurity ions causes flicker and the display quality deteriorates. Therefore, in the liquid crystal cell in which the pre-tilt angle on one substrate side is less than 90 degrees and the pre-tilt angle on the other substrate side is substantially 90 degrees, the present inventors further studied and focused on reducing asymmetry of electrical characteristics of an alignment film due to a difference in an exposure mode with respect to the alignment film.

SUMMARY

The present disclosure employs the following means.

[1] There is provided a liquid crystal display device having a plurality of pixels, including a first substrate, a second substrate configured to face the first substrate, a liquid crystal layer provided between the first substrate and the second substrate and configured to contain liquid crystal molecules, a first alignment film formed on the first substrate and configured to align the liquid crystal molecules, and a second alignment film formed on the second substrate and configured to align the liquid crystal molecules, wherein at least one of the first alignment film and the second alignment film is an optical alignment film, each of the pixels in the plurality of pixels has a first alignment region, a second alignment region, a third alignment region, and a fourth alignment region as regions in which alignment orientations of the liquid crystal molecules are different from each other, and the first alignment region, the second alignment region, the third alignment region, and the fourth alignment region are arranged and disposed in a longitudinal direction of the pixel, a difference between any two alignment orientations among the alignment orientation of the first alignment region, the alignment orientation of the second alignment region, the alignment orientation of the third alignment region, and the alignment orientation of the fourth alignment region is approximately equal to an integral multiple of 90 degrees, the plurality of pixels is arranged and disposed in a transverse direction of the pixels so that the alignment orientations of the alignment regions adjacent to each other in the transverse direction of the pixel are the same, in each of the first to fourth alignment regions, one of a pre-tilt angle defined by the first alignment film and a pre-tilt angle defined by the second alignment film is less than 90 degrees, and the other is substantially 90 degrees, the optical alignment film is formed using a polymer having an optical alignment group in a side chain, and a content of the optical alignment group in the side chain of the polymer is less than 1.1 mmol/g.

[2] There is provided a liquid crystal display device having a plurality of pixels, including a first substrate, a second substrate configured to face the first substrate, a liquid crystal layer provided between the first substrate and the second substrate and configured to contain liquid crystal molecules, a first alignment film formed on the first substrate and configured to align the liquid crystal molecules, and a second alignment film formed on the second substrate and configured to align the liquid crystal molecules, wherein at least one of the first alignment film and the second alignment film is an optical alignment film, each of the pixels in the plurality of pixels has a first alignment region, a second alignment region, a third alignment region, and a fourth alignment region as regions in which alignment orientations of the liquid crystal molecules are different from each other, and the first alignment region, the second alignment region, the third alignment region, and the fourth alignment region are arranged and disposed in a longitudinal direction of the pixel, a difference between any two alignment orientations among the alignment orientation of the first alignment region, the alignment orientation of the second alignment region, the alignment orientation of the third alignment region, and the alignment orientation of the fourth alignment region is approximately equal to an integral multiple of 90 degrees, the plurality of pixels is arranged and disposed in a transverse direction of the pixels so that the alignment orientations of the alignment regions adjacent to each other in the transverse direction of the pixels are the same, in each of the first to fourth alignment regions, one of a pre-tilt angle defined by the first alignment film and a pre-tilt angle defined by the second alignment film is less than 90 degrees, and the other is substantially 90 degrees, and at least one of the first alignment film and the second alignment film is formed by using a polymer having a structural unit derived from a maleimide compound.

[3] There is provided a liquid crystal display device having a plurality of pixels, including a first substrate, a second substrate configured to face the first substrate, a liquid crystal layer provided between the first substrate and the second substrate and configured to contain liquid crystal molecules, a first alignment film formed on the first substrate and configured to align the liquid crystal molecules, and a second alignment film formed on the second substrate and configured to align the liquid crystal molecules, wherein the first alignment film and the second alignment film are optical alignment films, each of the pixels in the plurality of pixels has a first alignment region, a second alignment region, a third alignment region, and a fourth alignment region as regions in which alignment orientations of the liquid crystal molecules are different from each other, and the first alignment region, the second alignment region, the third alignment region, and the fourth alignment region are arranged and disposed in a longitudinal direction of the pixel, a difference between any two alignment orientations among the alignment orientation of the first alignment region, the alignment orientation of the second alignment region, the alignment orientation of the third alignment region, and the alignment orientation of the fourth alignment region is approximately equal to an integral multiple of 90 degrees, the plurality of pixels is arranged and disposed in a transverse direction of the pixels so that the alignment orientations of the alignment regions adjacent to each other in the transverse direction of the pixels are the same, and in some of the alignment regions of the first to fourth alignment regions, a pre-tilt angle defined by the first alignment film is less than 90 degrees, a pre-tilt angle defined by the second alignment film is substantially 90 degrees, and in the remaining alignment regions, the pre-tilt angle defined by the first alignment film is substantially 90 degrees, and the pre-tilt angle defined by the second alignment film is less than 90 degrees.

[4] There is provided a liquid crystal display device having a plurality of pixels, including a first substrate, a second substrate configured to face the first substrate, a liquid crystal layer provided between the first substrate and the second substrate and configured to contain liquid crystal molecules, a first alignment film formed on the first substrate and configured to align the liquid crystal molecules, and a second alignment film formed on the second substrate and configured to align the liquid crystal molecules, wherein at least one of the first alignment film and the second alignment film is an optical alignment film, each of the pixels in the plurality of pixels has a first alignment region, a second alignment region, a third alignment region, and a fourth alignment region as regions in which alignment orientations of the liquid crystal molecules are different from each other, and the first alignment region, the second alignment region, the third alignment region, and the fourth alignment region are arranged and disposed in a longitudinal direction of the pixel, a difference between any two alignment orientations among the alignment orientation of the first alignment region, the alignment orientation of the second alignment region, the alignment orientation of the third alignment region, and the alignment orientation of the fourth alignment region is approximately equal to an integral multiple of 90 degrees, the plurality of pixels is arranged and disposed in a transverse direction of the pixels so that the alignment orientations of the alignment regions adjacent to each other in the transverse direction of the pixels are the same, in each of the first to fourth alignment regions, one of a pre-tilt angle defined by the first alignment film and a pre-tilt angle defined by the second alignment film is less than 90 degrees, and the other is substantially 90 degrees, one of the first alignment film and the second alignment film is dividedly exposed, and the other is not dividedly exposed, and the first alignment film and the second alignment film satisfy at least one of the following conditions (a) and (b):

(a) film compositions of the first alignment film and the second alignment film are different from each other.

(b) film thicknesses of the first alignment film and the second alignment film are different from each other.

[5] There is provided a liquid crystal display device having a plurality of pixels, including a first substrate, a second substrate configured to face the first substrate, a liquid crystal layer provided between the first substrate and the second substrate and configured to contain liquid crystal molecules, a first alignment film formed on the first substrate and configured to align the liquid crystal molecules, and a second alignment film formed on the second substrate and configured to align the liquid crystal molecules, wherein at least one of the first alignment film and the second alignment film is an optical alignment film, each of the pixels in the plurality of pixels has a first alignment region, a second alignment region, a third alignment region, and a fourth alignment region as regions in which alignment orientations of the liquid crystal molecules are different from each other, and the first alignment region, the second alignment region, the third alignment region, and the fourth alignment region are arranged and disposed in a longitudinal direction of the pixel, a difference between any two alignment orientations among the alignment orientation of the first alignment region, the alignment orientation of the second alignment region, the alignment orientation of the third alignment region, and the alignment orientation of the fourth alignment region is approximately equal to an integral multiple of 90 degrees, the plurality of pixels is arranged and disposed in a transverse direction of the pixels so that the alignment orientations of the alignment regions adjacent to each other in the transverse direction of the pixels are the same, in each of the first to fourth alignment regions, one of a pre-tilt angle defined by the first alignment film and a pre-tilt angle defined by the second alignment film is less than 90 degrees, and the other is substantially 90 degrees, one of the first substrate and the second substrate has a pixel electrode having a plurality of slits extending in an oblique direction with respect to each side of the pixel, and when an electrode width of the pixel electrode is L, a slit width of the pixel electrode is S, and a thickness of the liquid crystal layer is d, L<1.1d and S<d.

[6] There is provided a liquid crystal display device having a plurality of pixels, including a first substrate, a second substrate configured to face the first substrate, a liquid crystal layer provided between the first substrate and the second substrate and configured to contain liquid crystal molecules, a first alignment film formed on the first substrate and configured to align the liquid crystal molecules, and a second alignment film formed on the second substrate and configured to align the liquid crystal molecules, wherein at least one of the first alignment film and the second alignment film is an optical alignment film, each of the pixels in the plurality of pixels has a first alignment region, a second alignment region, a third alignment region, and a fourth alignment region as regions in which alignment orientations of the liquid crystal molecules are different from each other, and the first alignment region, the second alignment region, the third alignment region, and the fourth alignment region are arranged and disposed in a longitudinal direction of the pixel, a difference between any two alignment orientations among the alignment orientation of the first alignment region, the alignment orientation of the second alignment region, the alignment orientation of the third alignment region, and the alignment orientation of the fourth alignment region is approximately equal to an integral multiple of 90 degrees, the plurality of pixels is arranged and disposed in a transverse direction of the pixels so that the alignment orientations of the alignment regions adjacent to each other in the transverse direction of the pixels are the same, in each of the first to fourth alignment regions, one of a pre-tilt angle defined by the first alignment film and a pre-tilt angle defined by the second alignment film is less than 90 degrees, and the other is substantially 90 degrees, and the liquid crystal layer contains a chiral agent.

[7] There is provided a method for manufacturing a liquid crystal display device having a plurality of pixels, the liquid crystal display device including a first substrate, a second substrate configured to face the first substrate, a liquid crystal layer provided between the first substrate and the second substrate and configured to contain liquid crystal molecules, a first alignment film formed on the first substrate and configured to align the liquid crystal molecules, and a second alignment film formed on the second substrate and configured to align the liquid crystal molecules, wherein the first alignment film and the second alignment film are formed by applying a polymer composition on the substrates and heating the substrates, and at least one of the first alignment film and the second alignment film is an optical alignment film, each of the pixels in the plurality of pixels is formed to have a first alignment region, a second alignment region, a third alignment region, and a fourth alignment region as regions in which alignment orientations of the liquid crystal molecules are different from each other, and the first alignment region, the second alignment region, the third alignment region, and the fourth alignment region are arranged and disposed in a longitudinal direction of the pixel, a difference between any two alignment orientations among the alignment orientation of the first alignment region, the alignment orientation of the second alignment region, the alignment orientation of the third alignment region, and the alignment orientation of the fourth alignment region is approximately equal to an integral multiple of 90 degrees, the plurality of pixels is arranged and disposed in a transverse direction of the pixels so that the alignment orientations of the alignment regions adjacent to each other in the transverse direction of the pixels are the same, in each of the first to fourth alignment regions, one of a pre-tilt angle defined by the first alignment film and a pre-tilt angle defined by the second alignment film is less than 90 degrees, and the other is substantially 90 degrees, and at least one of a heating temperature when the first alignment film and the second alignment film are formed, a heating time when the first alignment film and the second alignment film are formed, film compositions of the first alignment film and the second alignment film, and film thicknesses of the first alignment film and the second alignment film is made different between the first alignment film and the second alignment film.

Figure 2:
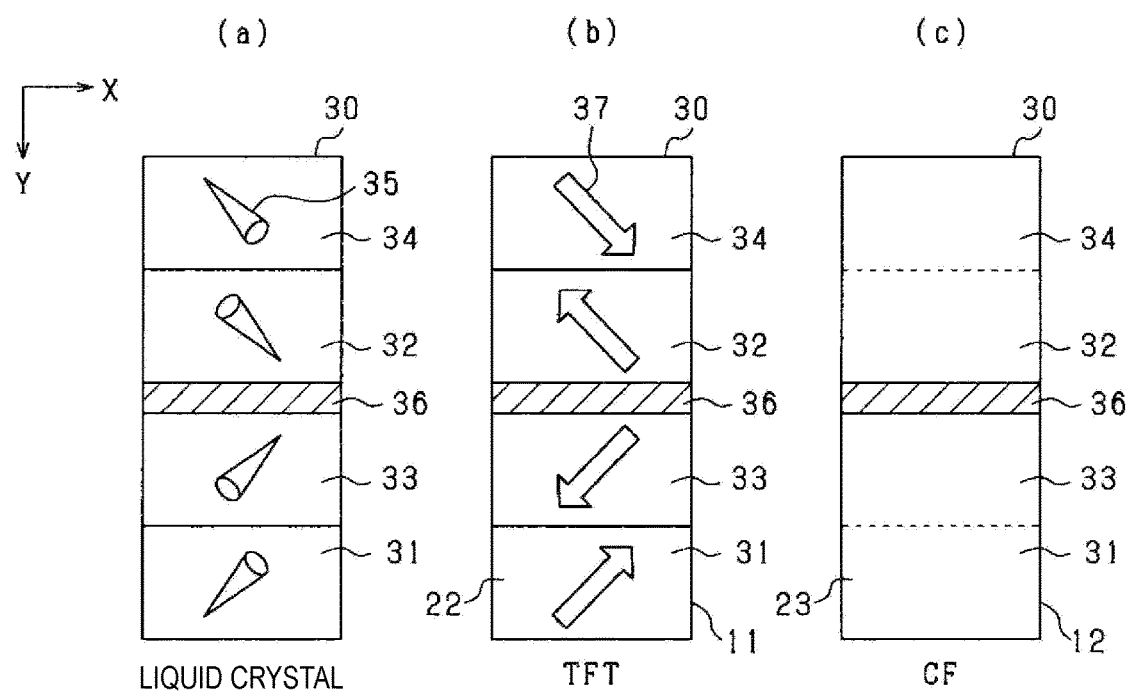

(a) to (c) of FIG. 2 are a view showing an example of an alignment pattern in one pixel of a first embodiment.

Figure 3:
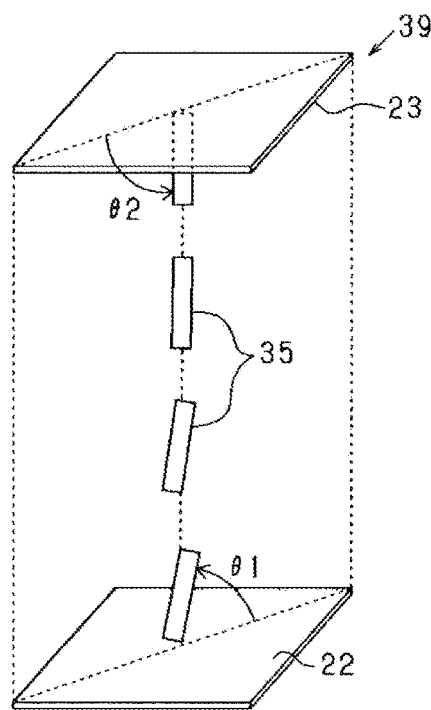

FIG. 3 is a schematic view showing a pre-tilt angle of liquid crystal molecules in one alignment region of the first embodiment.

Figure 4:
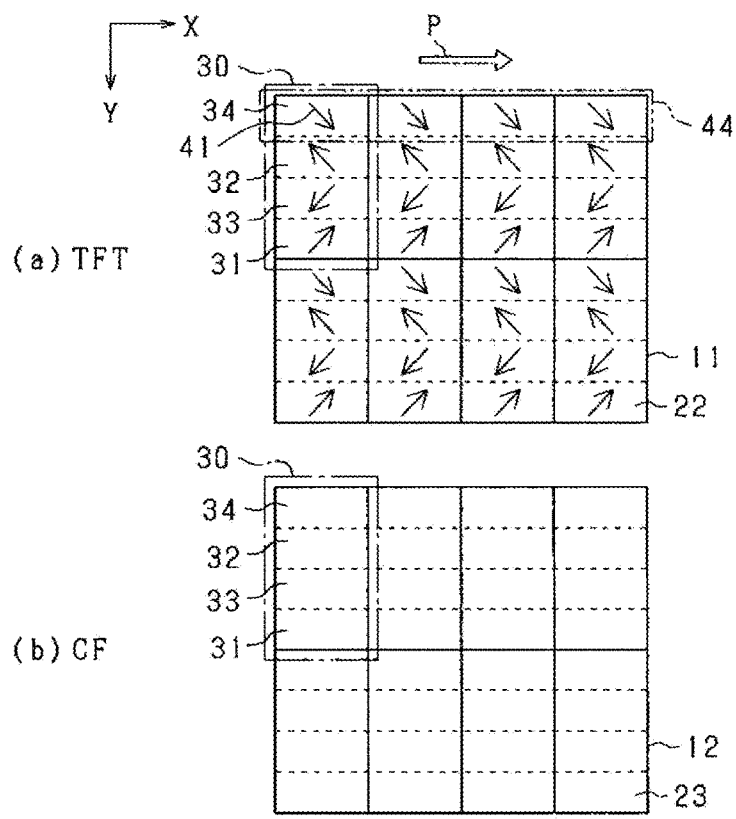

(a) and (b) of FIG. 4 are a view showing alignment processing of the first embodiment. (a) shows a first substrate, and (b) shows a second substrate.

Figure 5:
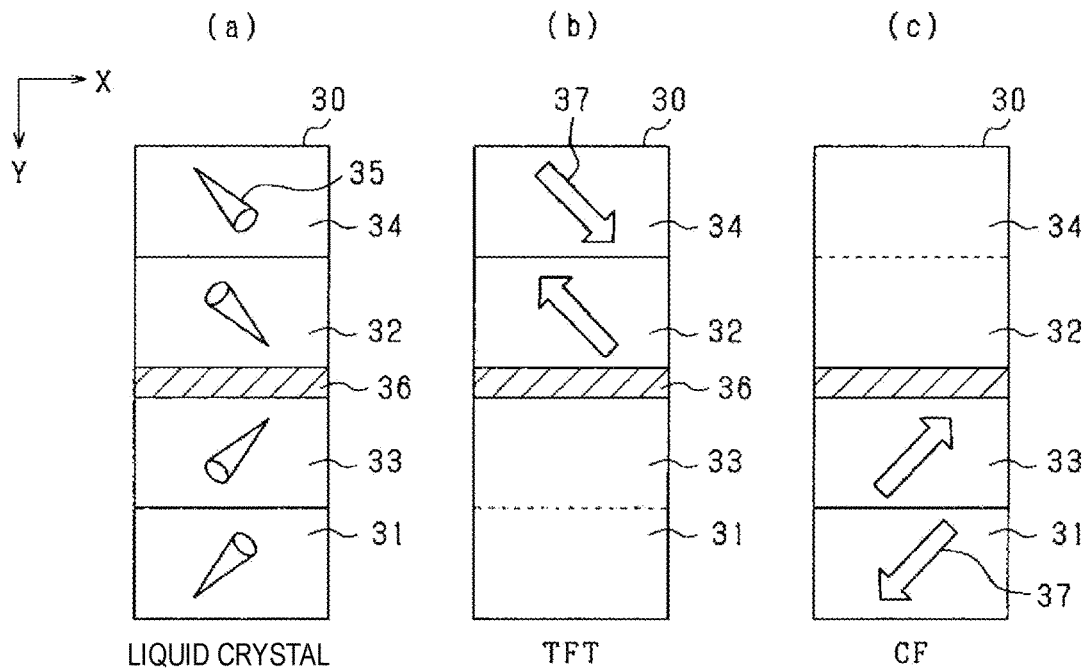

(a) to (c) of FIG. 5 are a view showing an example of an alignment pattern in one pixel of a sixth embodiment.

Figure 6:
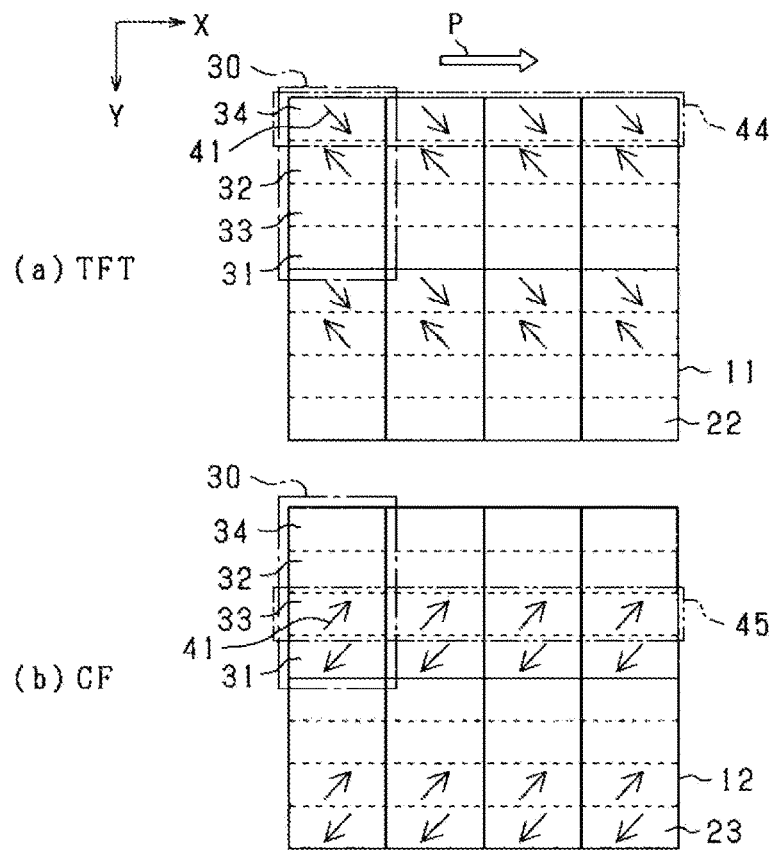

(a) and (b) of FIG. 6 are a view showing the alignment processing of the sixth embodiment. (a) shows the first substrate, and (b) shows the second substrate.

Figure 7:
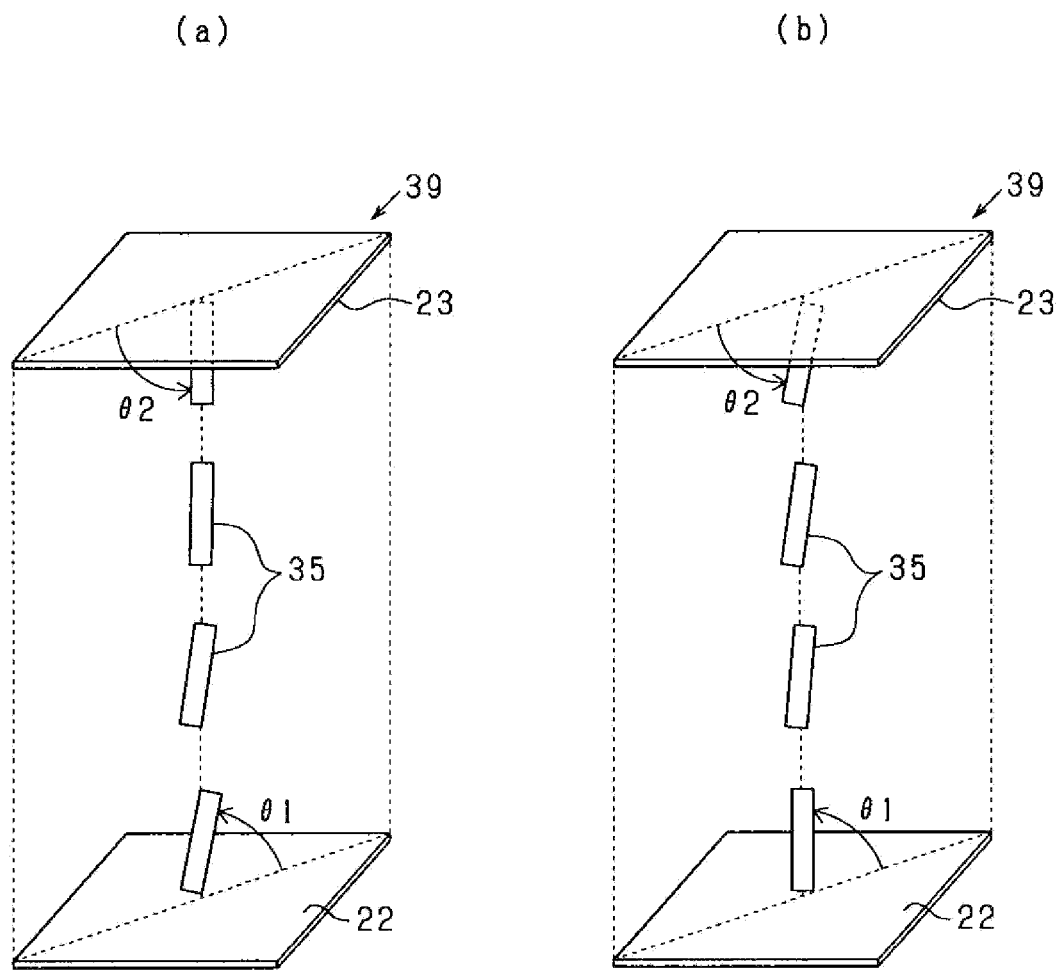

(a) and (b) of FIG. 7 are a schematic view showing the pre-tilt angle of the liquid crystal molecules in one alignment region of the sixth embodiment.

Figure 8:
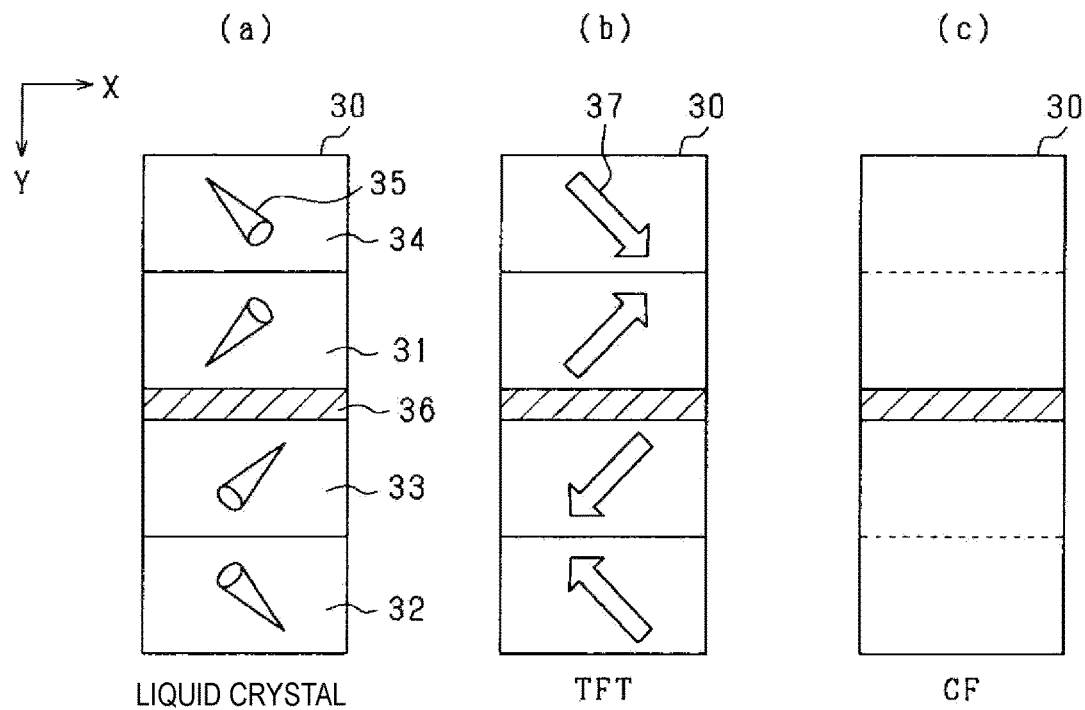

(a) to (c) of FIG. 8 are a view showing an example of an alignment pattern in one pixel of another embodiment.

Figure 9:
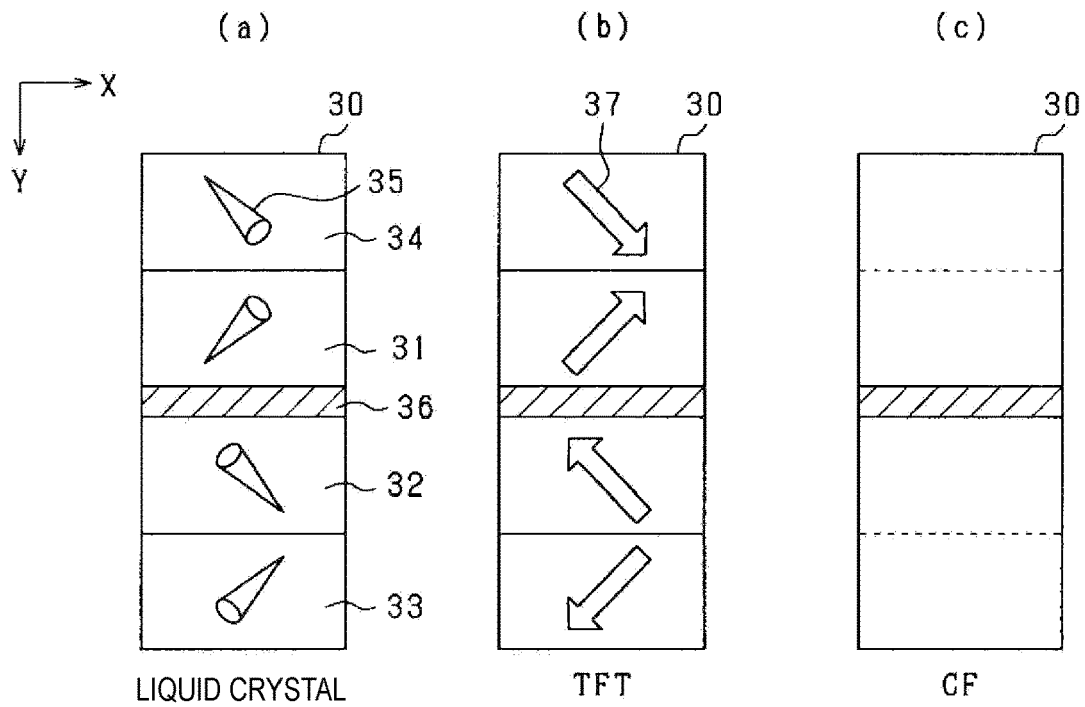

(a) to (c) of FIG. 9 are a view showing an example of the alignment pattern in one pixel of yet another embodiment.

Figure 10:
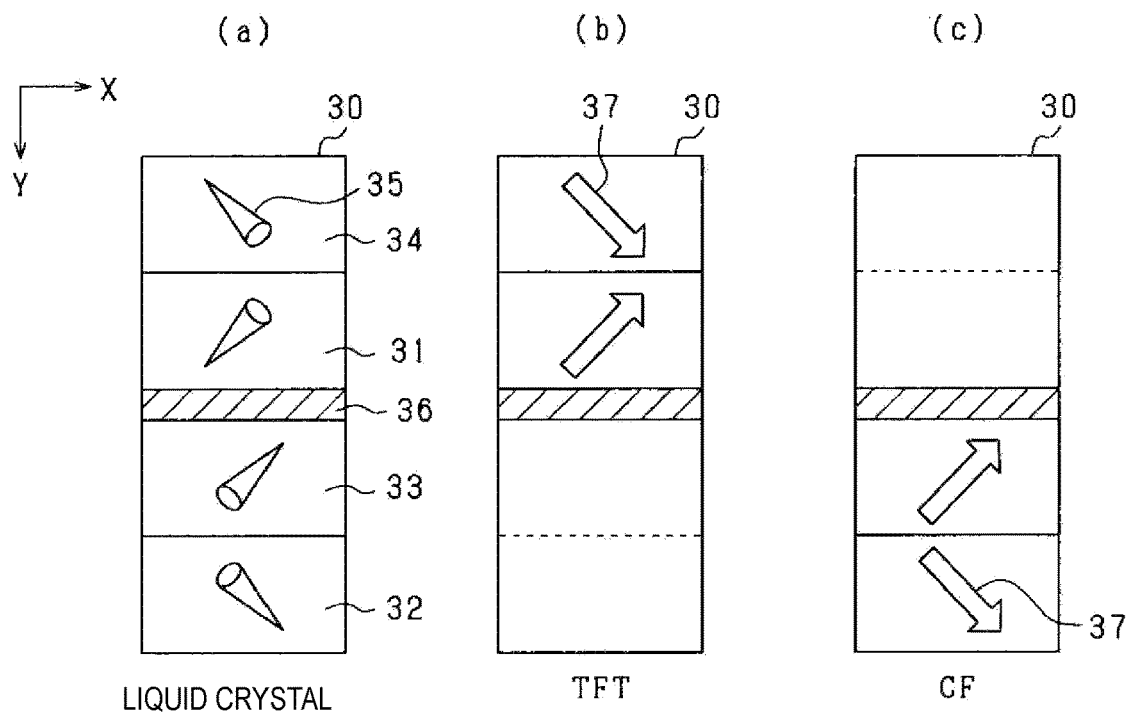

(a) to (c) of FIG. 10 are a view showing an example of an alignment pattern in one pixel of still another embodiment.

Figure 11:
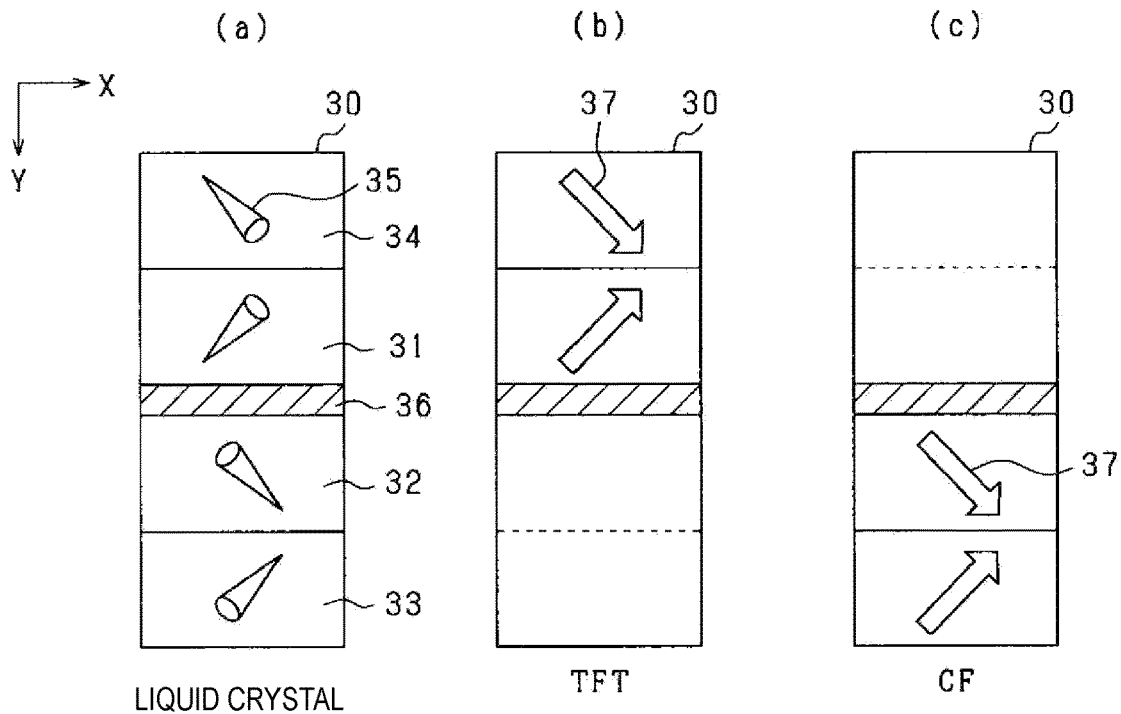

(a) to (c) of FIG. 11 are a view showing an example of an alignment pattern in one pixel of yet still another embodiment.

Figure 12:
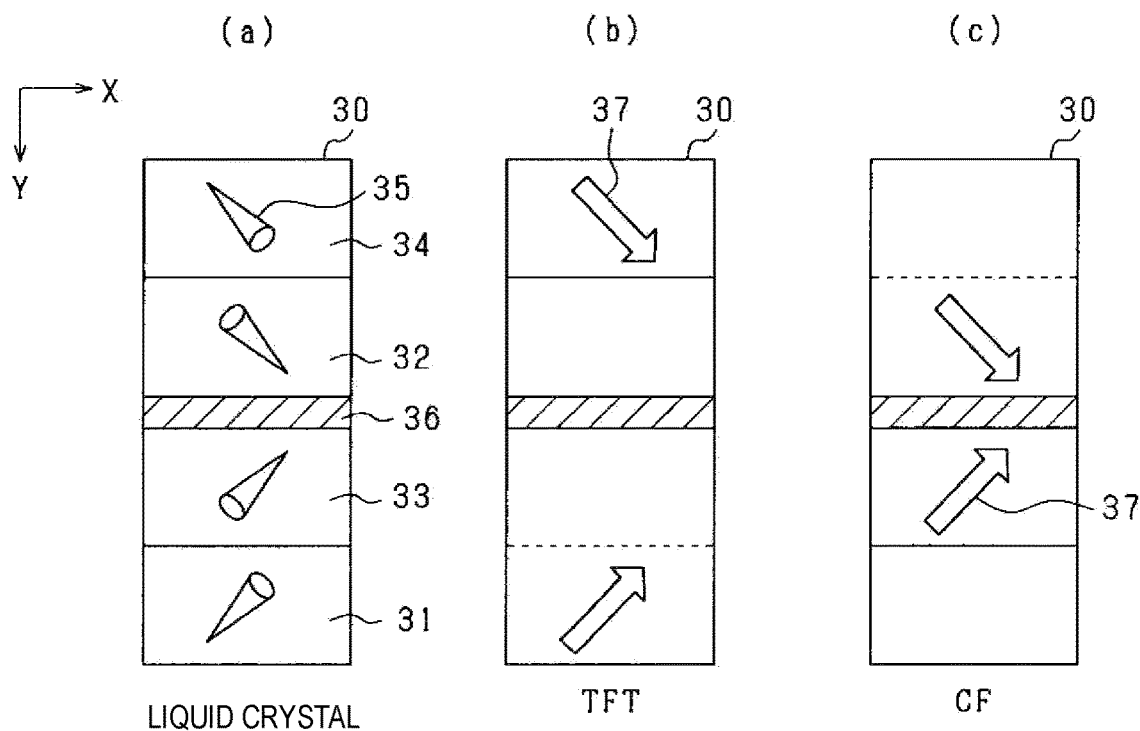

(a) to (c) of FIG. 12 are a view showing an example of an alignment pattern in one pixel of yet still another embodiment.

Figure 13:
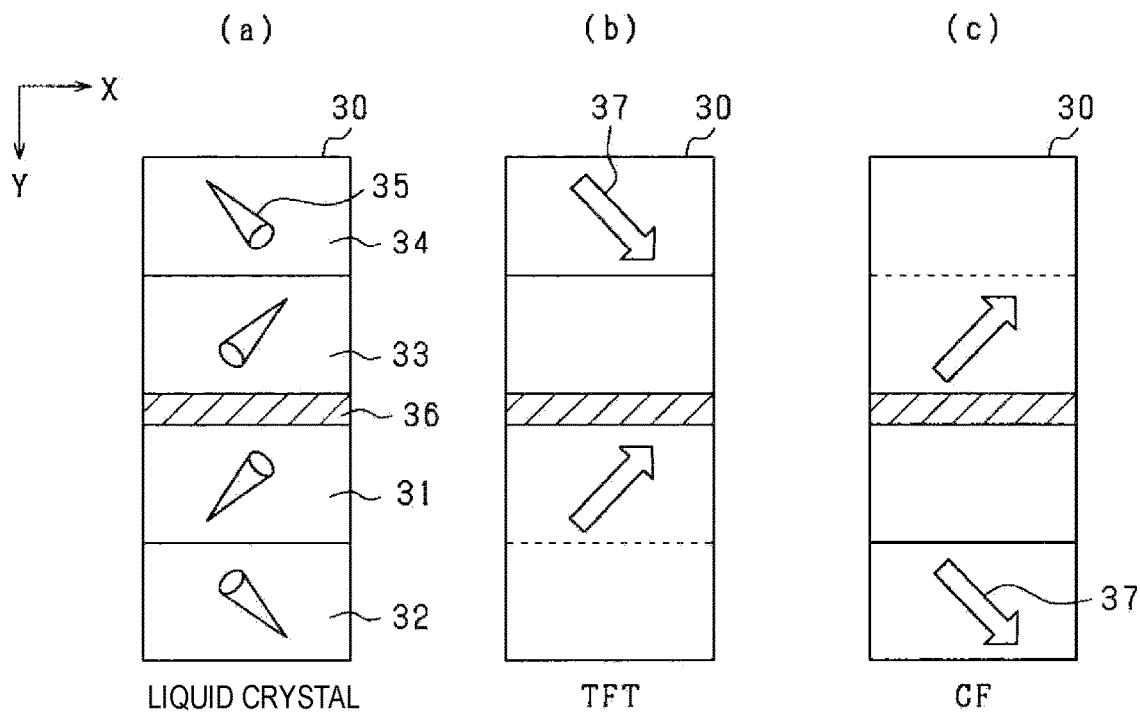

(a) to (c) of FIG. 13 are a view showing an example of an alignment pattern in one pixel of yet still another embodiment.

Figure 14:
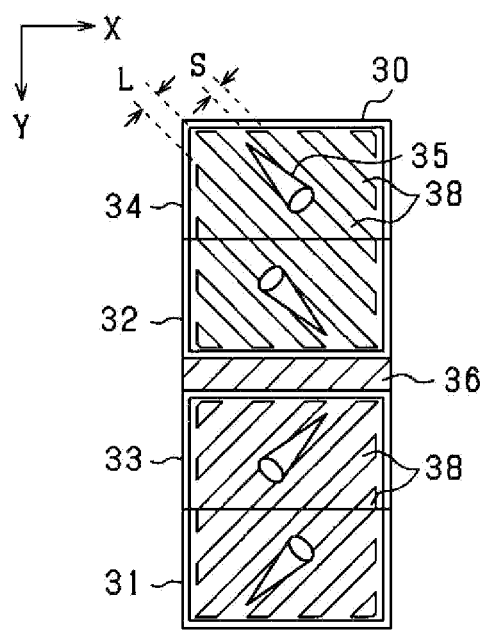

FIG. 14 is a view showing an example of a slit electrode.

Figure 15:
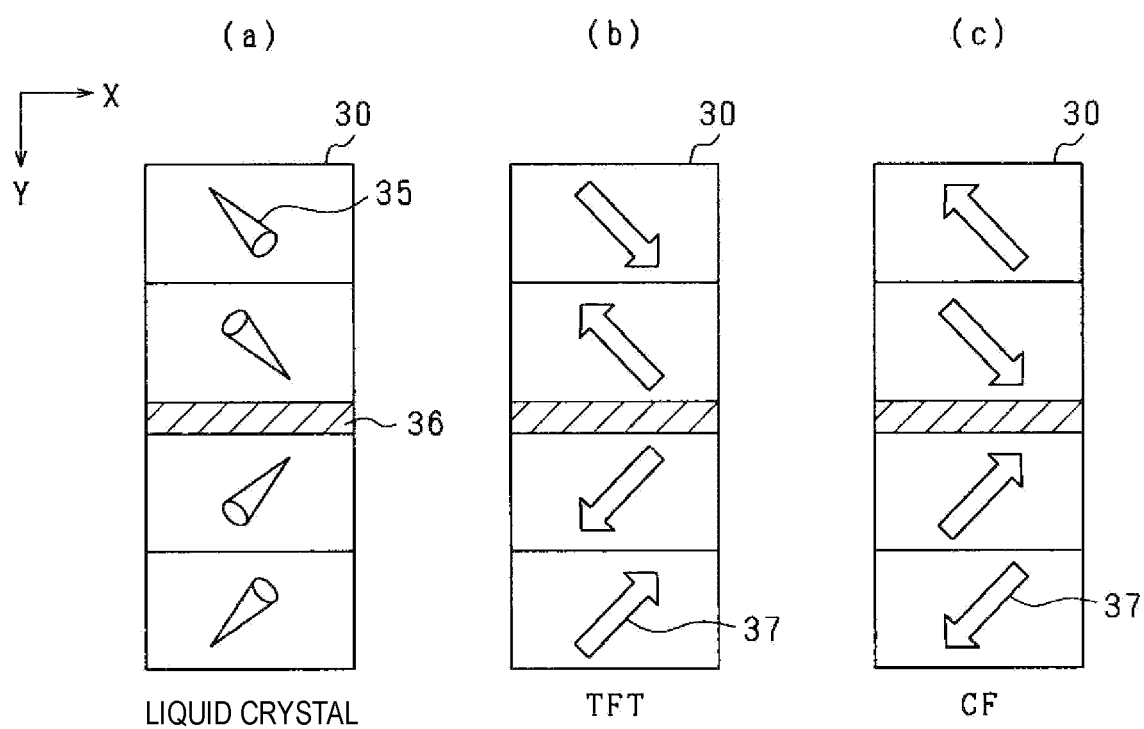

(a) to (c) of FIG. 15 are a view showing an example of an alignment pattern in one pixel of Comparative Example 1.

DESCRIPTION OF EMBODIMENTS

According to the present disclosure, it is possible to obtain a liquid crystal display device having a small number of alignment exposures, good throughput in production, less occurrence of flicker, and excellent display quality.

First Embodiment

Hereinafter, a first embodiment will be described with reference to the drawings. In each of the following embodiments, parts which are the same or equivalent to each other are designated by the same reference numerals in the drawings, and description thereof will be incorporated for the parts having the same reference numerals.

In the present specification, a "pixel" is a minimum unit for expressing a shade (gradation) of each of colors in a display, and corresponds to a unit for expressing each gradation such as R, G, and B in a color filter type display device, for example. Therefore, when the term "pixel" is used, it refers to each of an R pixel, a G pixel, and a B pixel, not a color display pixel (a picture element) in which the R pixels, the G pixels, and the B pixels are combined. That is, in the case of a color liquid crystal display device, one pixel corresponds to one color of a color filter. A "pre-tilt angle" is an angle formed between a surface of an alignment film and a major axis direction of liquid crystal molecules in the vicinity of the alignment film when a voltage is off.

Figure 1:
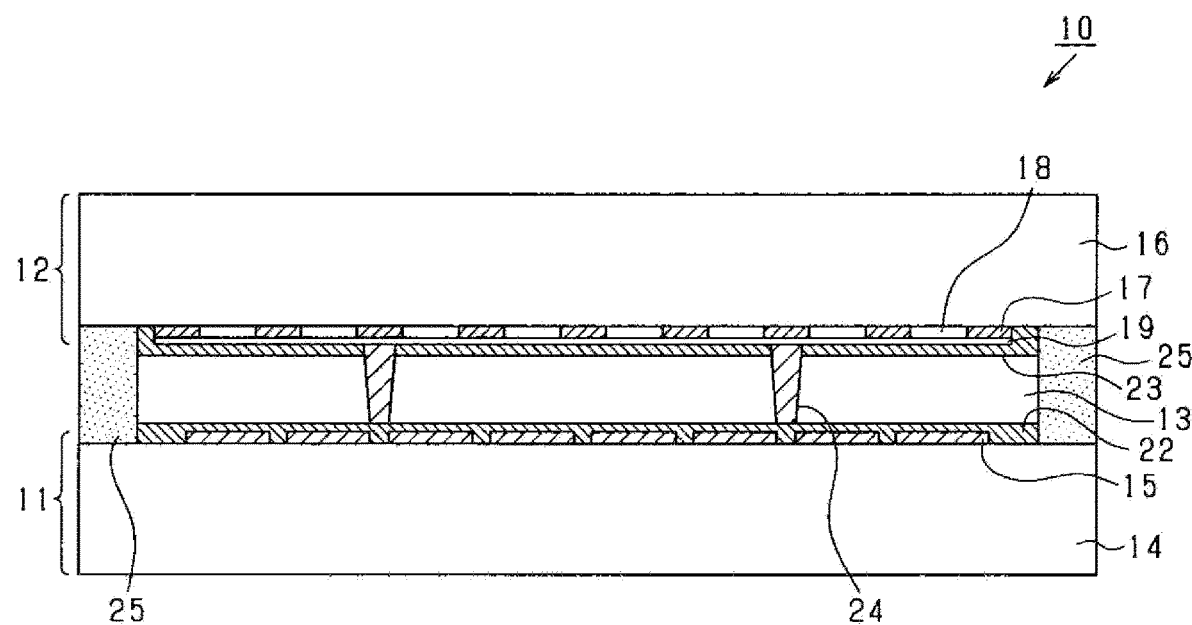
FIG. 1 is a schematic view showing a schematic configuration of a liquid crystal display device.

As shown in FIG. 1, a liquid crystal display device 10 includes a pair of substrates configured of a first substrate 11 and a second substrate 12, and a liquid crystal layer 13 disposed between the first substrate 11 and the second substrate 12. The liquid crystal display device 10 is a thin film transistor (TFT) type liquid crystal display device. The present disclosure may also be applied to other drive methods (for example, a passive matrix method, a plasma address method, and the like).

The first substrate 11 is a TFT substrate in which a pixel electrode 15 made of a transparent conductor such as ITO (indium tin oxide), a TFT as a switching element, and various wirings such as scanning lines and signal lines are disposed on a surface of a transparent substrate 14 made of glass, a resin, or the like on the liquid crystal layer 13 side. The second substrate 12 is a CF substrate in which a black matrix 17, a color filter 18, and a counter electrode 19 (also referred to as a common electrode) made of a transparent conductor are provided on a surface of a transparent substrate 16 made of glass or a resin on the liquid crystal layer 13 side.

A liquid crystal alignment film which aligns liquid crystal molecules in a predetermined orientation with respect to a film surface is formed on the pair of substrates 11 and 12. The liquid crystal alignment film is a vertical alignment film. The liquid crystal display device 10 includes a first alignment film 22 formed on an electrode arrangement surface of the first substrate 11 and a second alignment film 23 formed on an electrode arrangement surface of the second substrate 12 as the liquid crystal alignment films.

The first substrate 11 and the second substrate 12 are disposed with a predetermined gap (a cell gap) interposed therebetween via a spacer 24 so that the electrode arrangement surface of the first substrate 11 and the electrode arrangement surface of the second substrate 12 face each other. Although a columnar spacer is shown as a spacer 24 in FIG. 1, it may be another spacer such as a bead spacer. The pair of substrates 11 and 12 disposed to face each other are bonded to each other via a sealing material 25 at peripheral edge portions thereof. A space surrounded by the first substrate 11, the second substrate 12, and the sealing material 25 is filled with a liquid crystal composition. Thus, the liquid crystal layer 13 is formed between the first substrate 11 and the second substrate 12. The liquid crystal layer 13 is filled with a liquid crystal having a negative dielectric anisotropy.

A polarizing plate (not shown) is disposed outside each of the first substrate 11 and the second substrate 12. A terminal region is provided on an outer edge portion of the first substrate 11. The liquid crystal display device 10 is driven by connecting a driver IC or the like for driving the liquid crystal to this terminal area.

At least one of the first alignment film 22 and the second alignment film 23 is an optical alignment film, and in the present embodiment, at least the first alignment film 22 is an optical alignment film. In the present specification, the "optical alignment film" refers to a liquid crystal alignment film formed by irradiating a coating film formed of a polymer having an optical alignment group with polarized or unpolarized light. The "optical alignment group" is a functional group which imparts anisotropy to a film by a photoisomerization reaction, a photodimerization reaction, a photodecomposition reaction, a photorearrangement reaction, or the like by light irradiation.

The first alignment film 22 is dividedly exposed so that an alignment orientation of the liquid crystal molecules is different for each region due to the optical alignment treatment. The first alignment film 22 is formed by obliquely irradiating a coating film formed of a polymer having an optical alignment group with polarized radiation a plurality of times using a photomask (for example, a polarizer). On the other hand, the second alignment film 23 is not dividedly exposed. In the present embodiment, the coating film formed using the same polymer composition as that of the first alignment film 22 is used as it is without irradiating with light. Thus, the pre-tilt angle defined by the first alignment film 22 and the pre-tilt angle defined by the second alignment film 23 are different from each other. Specifically, the pre-tilt angle defined by the first alignment film 22 is set to less than 90 degrees, and the pre-tilt angle defined by the second alignment film 23 is set to substantially 90 degrees.

Instead of a configuration in which the second alignment film 23 is not irradiated with light, unpolarized light exposure may be performed on the entire surface of the second alignment film 23 from a normal direction of the substrate without using a photomask. In this case, the exposure of the second substrate 12 may be performed with parallel light or diffused light.

The liquid crystal display device 10 has a plurality of pixels 30, and the plurality of pixels 30 is arranged in a matrix in a display region of the liquid crystal display device 10. Each of the pixels 30 has a plurality of regions in which each of the pixel regions is aligned and divided, and alignment orientations of the liquid crystal molecules are different from each other. Thus, viewing angle characteristics of the liquid crystal display device 10 are compensated for. (a) to (c) of FIG. 2 show an example of an alignment pattern of the pixels 30. In (a) of FIG. 2, a cone represents the liquid crystal molecule 35, the apex side of the cone represents the first substrate 11 side, and the bottom surface side of the cone represents the second substrate 12 side. (a) of FIG. 2 is a view of the liquid crystal display device 10 when seen from the second substrate 12 side.

As an example, as shown in (a) of FIG. 2, four alignment regions in which the alignment orientations of the liquid crystal molecules 35 are different from each other are formed on each of the pixels 30. These four alignment regions (a first domain 31, a second domain 32, a third domain 33, and a fourth domain 34) are arranged and disposed in a longitudinal direction of the pixel 30 (a Y direction in (a) to (c) of FIG. 2) in one pixel. The alignment orientations of the liquid crystal molecules 35 in the first to fourth domains 31 to 34 are set so that a difference between any two alignment orientations is approximately equal to an integral multiple of 90 degrees. In the present specification, unless otherwise specified, the "alignment orientations of the liquid crystal molecules" mean the alignment orientations of the liquid crystal molecules in a layer plane of the liquid crystal layer 13 and near the center in a thickness direction when a voltage is applied to the liquid crystal display device 10.

Specifically, when a transverse direction X of the pixel 30 is 0 degrees, the alignment orientation of the liquid crystal molecule 35 is substantially 45 degrees in the first domain 31, substantially 135 degrees in the second domain 32, substantially 225 degrees in the third domain 33, and substantially 315 degrees in the fourth domain 34. As shown in (a) of FIG. 2, the four domains 31 to 34 are disposed in one pixel in the order of the fourth domain 34, the second domain 32, the third domain 33, and the first domain 31 in a longitudinal direction of the pixel 30. A signal line 36 is disposed at a position at which a light transmission region (hereinafter, also referred to as "pixel region") of each of the pixels 30 is divided into two regions in the longitudinal direction of the pixel 30. The two domains (the fourth domain 34 and the second domain 32) forming one of the pixel regions divided by the signal line 36 and the two domains (the third domain 33 and the first domain 31) forming the other are different from each other by 180 degrees in the alignment orientation of the liquid crystal molecule 35 in each of the domains (refer to (a) of FIG. 2).

In the present specification, "substantially 45 degrees", "substantially 135 degrees", "substantially 225 degrees", and "substantially 315 degrees" refer to a range of 45 degrees±0.5 degrees, a range of 135 degrees±0.5 degrees, a range of 225 degrees±0.5 degrees, and a range of 315 degrees±0.5 degrees. Each of the angles is preferably β degrees±0.2 degrees, more preferably β degrees±0.1 degrees (where β is 45, 135, 225 or 315).

(b) and (c) of FIG. 2 schematically show an orientation (a tilt orientation) in a state in which the major axis direction of the liquid crystal molecules on the surface of the alignment film of one pixel 30 on each of the substrates is projected onto the substrate in a voltage-off state. In (a) to (c) of FIG. 2, (b) shows the first substrate 11, and (c) shows the second substrate 12. An arrow 37 in (a) to (c) of FIG. 2 indicates the tilt orientation. In the liquid crystal display device 10, desired pre-tilt angle characteristics are imparted to the domains 31 to 34 by irradiating the first alignment film 22 of the first alignment film 22 and the second alignment film 23 with polarized radiation in a direction corresponding to the alignment orientation of the liquid crystal molecule 35. Thus, the alignment orientations of the liquid crystal molecules 35 in the liquid crystal display device 10 are the orientations shown in (a) of FIG. 2. On the other hand, the second alignment film 23 is not irradiated with polarized ultraviolet rays. Due to such exposure processing, in each of the alignment regions 39 of the first to fourth domains 31 to 34, as shown in FIG. 3, a pre-tilt angle θ1 defined by the first alignment film 22 is set to less than 90 degrees, and a pre-tilt angle θ2 defined by the second alignment film 23 is set to substantially 90 degrees.

The pre-tilt angle θ1 may be smaller than the pre-tilt angle θ2 defined by the second alignment film 23, but is preferably 89.0 degrees or less, more preferably 88.5 degrees or less, even more preferably 88.0 degrees or less from the viewpoint of curbing response delay of the liquid crystal molecule 35. Further, from the viewpoint of curbing decrease in contrast of the liquid crystal display device 10, the pre-tilt angle θ1 is preferably 81.0 degrees or more, more preferably 83.0 degrees or more, even more preferably 84.0 degrees or more. In the present specification, the term "substantially 90 degrees" means a range of 90 degrees±0.5 degrees. The pre-tilt angle θ is preferably 90 degrees±0.2 degrees and is more preferably 90 degrees±0.1 degrees.

As shown in (b) of FIG. 2, the tilt orientations on the first substrate 11 side are different from each other in the first to fourth domains 31 to 34, and a difference in the tilt orientations in any two domains is approximately equal to an integral multiple of 90 degrees. Specifically, when the transverse direction X of the pixel 30 is 0 degrees, the tilt orientation in each of the domains is substantially 45 degrees in the first domain 31, is substantially 135 degrees in the second domain 32, is substantially 225 degrees in the third domain 33, and is substantially 315 degrees in the fourth domain 34.

(Liquid Crystal Alignment Agent)

Next, a polymer composition for forming the first alignment film 22 and the second alignment film 23 (hereinafter, also referred to as a "liquid crystal alignment agent") will be described. In the present embodiment, the first alignment film 22 and the second alignment film 23 are formed using a liquid crystal alignment agent containing a polymer (hereinafter, also referred to as a "maleimide-based polymer") having a structural unit derived from a maleimide compound as a polymer component. Using a liquid crystal alignment agent containing a maleimide-based polymer is preferable from the viewpoint that occurrence of flicker can then be curbed in the liquid crystal display device 10.

The maleimide-based polymer can be obtained using a maleimide compound as at least a part of a monomer. Examples of the maleimide compound include a compound having a group (a group represented by the following formula (C-1)) from which a hydrogen atom bonded to a nitrogen atom of maleimide has been removed, and a compound having a structure (a group represented by the following formula (C-2)) derived from a ring-opened maleimide entity.

[Chem. 1]

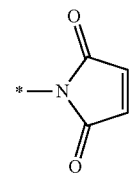

(C-1)

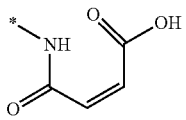

(In Formulas (C-1) and (C-2), "*" indicates a bond.)

As the maleimide-based polymer used when the first alignment film 22 and the second alignment film 23 are formed, it is preferable to use a polymer (hereinafter, also referred to as a "styrene-maleimide-based polymer") having a structural unit derived from a maleimide compound and a structural unit derived from a styrene compound, because an effect of curbing the occurrence of flicker can then be sufficiently obtained. In the styrene-maleimide-based polymer, a content ratio of the structural unit derived from the maleimide compound is preferably 2 mol % or more, more preferably 2 to 85 mol %, and even more preferably 2 to 80 mol % with respect to all the structural units of the styrene-maleimide-based polymer. Further, a content ratio of the structural unit derived from the styrene compound is preferably 2 mol % or more, more preferably 2 to 80 mol %, and even more preferably 5 to 70 mol % with respect to all the structural units of the styrene-maleimide-based polymer.

The styrene-maleimide-based polymer may have only the structural unit derived from the styrene compound and the structural unit derived from the maleimide compound, but may further have a structural unit derived from a monomer (for example, a (meth)acrylic compound, a conjugated diene compound, or the like) other than the styrene compound and the maleimide compound. In that case, a content ratio of the structural unit derived from the monomer other than the styrene compound and the maleimide compound is preferably 5 mol % or less, and more preferably 1 mol % or less with respect to all the structural units of the styrene-maleimide-based polymer.

When an optical alignment film is formed, a maleimide-based polymer having an optical alignment group is preferably used as the maleimide-based polymer. Specific examples of the optical alignment group include an azobenzene-containing group containing azobenzene or a derivative thereof as a basic structure, a cinnamic acid structure containing group containing cinnamic acid or a derivative thereof (a cinnamic acid structure) as a basic structure, a chalcone-containing group containing chalcone or a derivative thereof as a basic structure, a benzophenone-containing group containing benzophenone or a derivative thereof as a basic structure, a phenylbenzoate-containing group containing phenylbenzoate or a derivative thereof as a basic structure, a coumarin-containing group containing coumarin or a derivative thereof as a basic structure, and the like. Among them, a maleimide-based polymer having a cinnamic acid structure as an optical alignment group is preferably used because of high photoreactivity thereof.

The maleimide-based polymer can be obtained, for example, by polymerizing a monomer in the presence of a polymerization initiator. The polymerization initiator used is preferably an azo compound such as 2,2'-azobis(isobutyronitrile), 2,2'-azobis(2,4-dimethylvaleronitrile), or 2,2'-azobis(4-methoxy-2,4-dimethylvaleronitrile). A using ratio of the polymerization initiator is preferably 0.01 to 30 parts by mass with respect to 100 parts by mass of all the monomers used in the reaction. The polymerization reaction is preferably carried out in an organic solvent. Examples of the organic solvent used in the reaction include alcohols, ethers, ketones, amides, esters, hydrocarbon compounds, and the like. A reaction temperature is preferably 30° C. to 120° C., and a reaction time is preferably 1 to 36 hours. An amount (a) of the organic solvent used is preferably such that a total amount (b) of the monomers used in the reaction is 0.1 to 60% by mass with respect to a total amount (a+b) of reaction solution.

When the maleimide-based polymer having the optical alignment group is obtained, the polymerization may be carried out using a monomer having an optical alignment group (for example, a maleimide compound containing an optical alignment group), or a maleimide-based polymer having an optical alignment group in a side chain may be synthesized by obtaining a maleimide-based polymer having a reactive group (for example, an epoxy group) and then reacting the obtained polymer with a reactive compound (for example, a carboxylic acid) having an optical alignment group. The reaction between the maleimide-based polymer having a reactive group and the reactive compound can be carried out according to a known method. Specific examples of the maleimide compound having an optical alignment group are shown below (compounds (B-1) to (B-8)). However, the monomer used for obtaining the maleimide-based polymer having an optical alignment group is not limited to the following compounds.

[Chem. 2]

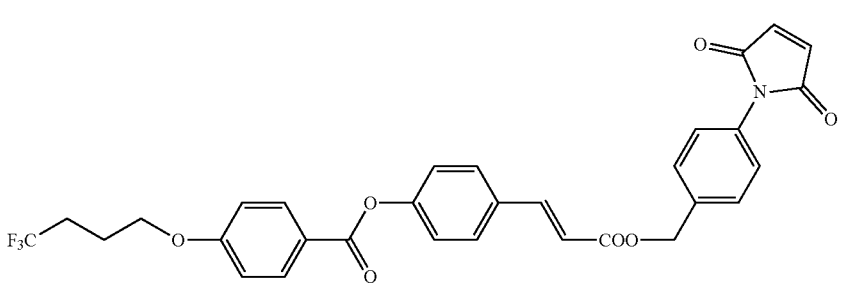

-continued
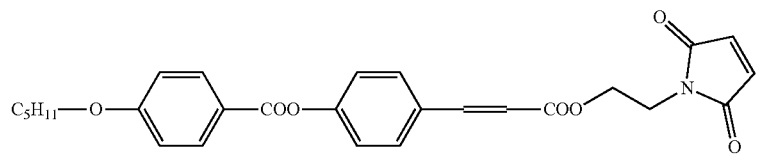
(B-2)
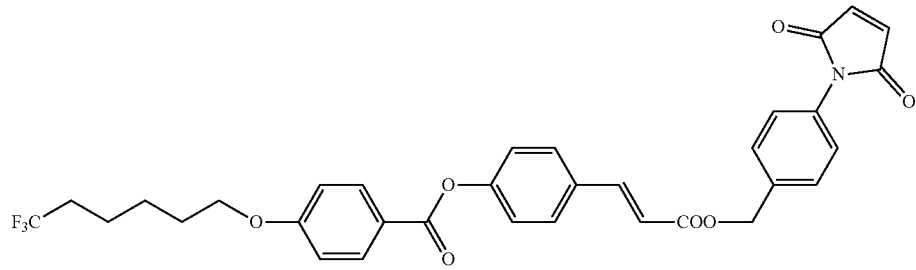
(B-3)
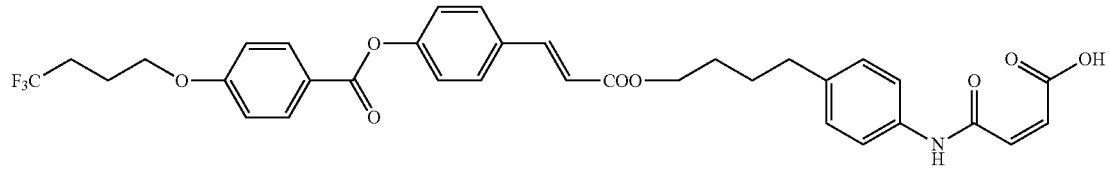
(B-4)
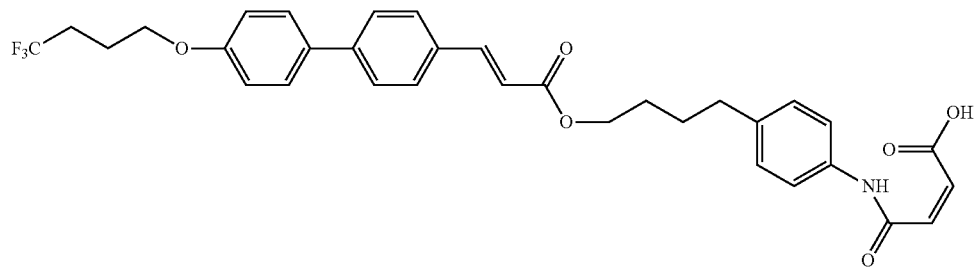
(B-5)
[Chem. 3]
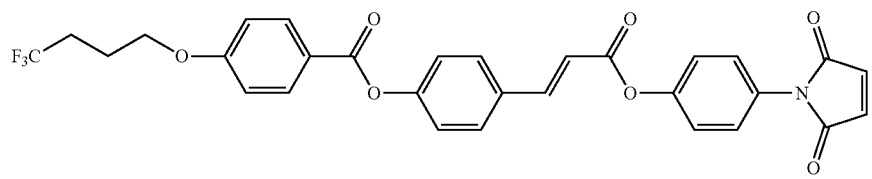
(B-6)
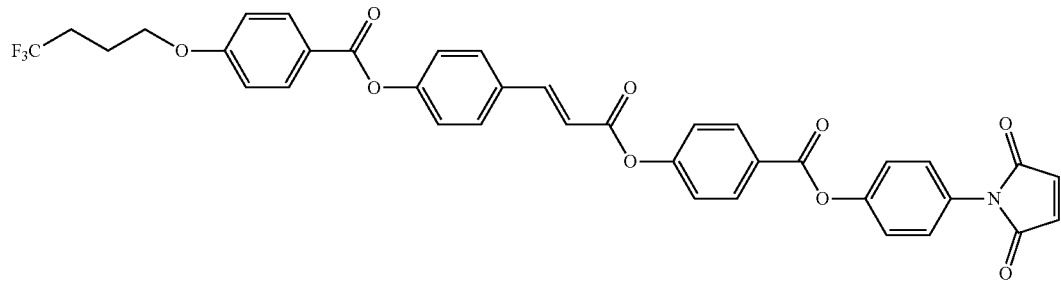
(B-7)
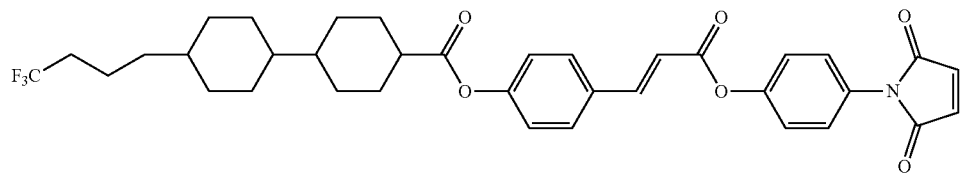
(B-8)

A content of the optical alignment group in the side chain of the maleimide-based polymer having an optical alignment group (hereinafter, also referred to as a "content of the photosensitive side chains") is preferably less than 1.1 mmol/g from the viewpoint that an effect in which curbing of the occurrence of flicker and curbing of DC deviation in the liquid crystal display device are improved can be further enhanced. The content of the photosensitive side chains of the maleimide-based polymer having an optical alignment group is more preferably 1.0 mmol/g or less, and even more preferably 0.95 mmol/g or less. Further, the content of the photosensitive side chains of the maleimide-based polymer having an optical alignment group is preferably 0.1 mmol/g or more, and more preferably 0.2 mmol/g or more from the viewpoint of imparting the desired pre-tilt angle characteristics to a coating film due to light irradiation.

For the maleimide-based polymer, a weight average molecular weight (Mw) in terms of polystyrene measured by gel permeation chromatography (GPC) is preferably 1,000 to 300,000, and more preferably 2,000 to 100,000. A molecular weight distribution (Mw/Mn) represented by a ratio of Mw to a number average molecular weight (Mn) in terms of polystyrene measured by GPC is preferably 7 or less and more preferably 5 or less. In preparing the liquid crystal alignment agent, one type of maleimide-based polymer can be used alone, or two or more types can be used in combination.

The liquid crystal alignment agent used for forming the first alignment film 22 and the second alignment film 23 contains the maleimide-based polymer as described above, but may contain other components shown below, if necessary.

The liquid crystal alignment agent preferably contains a maleimide-based polymer and a polymer (hereinafter referred to as "other polymers") different from the maleimide-based polymer for the purpose of improving electrical characteristics and reducing costs. Examples of other polymers include polyamic acid, polyimide, polyamic acid ester, polyamide, polyorganosiloxane, a (meth)acrylic polymer, and the like. The other polymers are preferably at least one selected from a group consisting of polyamic acids, polyamic acid esters and polyimides from the viewpoint of improving the electrical characteristics, affinity with the liquid crystal, mechanical strength, and affinity with the maleimide-based polymer. A blending ratio of the other polymers is preferably 80% by mass or less, and more preferably 10 to 70% by mass with respect to the total amount of the polymer used for preparing the liquid crystal alignment agent. As other polymers, one type may be used alone, or two or more types may be used in combination.

Examples of other components include, for example, a compound having at least one epoxy group in the molecule (for example, ethylene glycol diglycidyl ether, N,N,N',N'-tetraglycidyl-m-xylenediamine, N,N,N',N'-tetraglycidyl-4,4'-diaminodiphenylmethane, or the like), a functional silane compound, a polyfunctional (meth)acrylate, an antioxidant, a metal chelate compound, a curing accelerator, a surfactant, a filler, a dispersant, a photosensitizer, and the like, in addition to the above. A blending ratio of the other components can be appropriately selected according to each of the compounds as long as the effects of the present disclosure are not impaired.

The liquid crystal alignment agent is prepared as a solution-like composition in which the polymer component and other components optionally blended in as needed are preferably dissolved in an organic solvent. One or more of the known compounds used in the preparation of the liquid crystal alignment agent can be used as the organic solvent used. A solid content concentration in the liquid crystal alignment agent (a ratio of a total mass of the components other than the solvent of the liquid crystal alignment agent to a total mass of the liquid crystal alignment agent) is appropriately selected in consideration of viscosity, volatility, or the like, but is preferably in a range of 1 to 10% by mass from the viewpoint of improving coatability and making a film thickness of the liquid crystal alignment film appropriate.

Instead of the configuration in which the first alignment film 22 and the second alignment film 23 are formed using the maleimide-based polymer, one of the first alignment film 22 and the second alignment film 23 may be formed using the maleimide-based polymer, and the other may be formed using a polymer different from the maleimide-based polymer. Examples of the polymer different from the maleimide-based polymer include polyamic acids, polyimides, polyamic acid esters, polyamides, polyorganosiloxanes, and (meth)acrylic polymers.

(Method for Manufacturing Liquid Crystal Display Device)

Next, a method for manufacturing the liquid crystal display device 10 will be described. The liquid crystal display device 10 can be manufactured by a method including the following Steps 1 to 3.

<Step 1: Formation of Coating Film>

First, the first substrate 11 and the second substrate 12 are prepared. Subsequently, a liquid crystal alignment agent is applied on each of the electrode arrangement surfaces of the first substrate 11 and the second substrate 12, and a coating film is formed on each of the substrates. The liquid crystal alignment agent is preferably applied to the substrate by an offset printing method, a flexographic printing method, a spin coating method, a roll coater method, or an inkjet printing method.

After the liquid crystal alignment agent is applied, pre-heating (pre-baking) is preferably performed for the purpose of preventing the applied liquid crystal alignment agent from dripping, and the like. A pre-baking temperature is preferably 30 to 200° C., and a pre-baking time is preferably 0.25 to 10 minutes. After that, firing (post-baking) is carried out for the purpose of completely removing the solvent. A firing temperature (a post-baking temperature) is preferably 80 to 300° C., and a post-baking time is preferably 5 to 200 minutes. A film thickness of the liquid crystal alignment film formed is preferably 0.001 to 1 μm.

<Step 2: Alignment Treatment>

Subsequently, in order to impart the desired pre-tilt angle characteristics to the liquid crystal alignment film, at least one of the coating films (the liquid crystal alignment films) formed in Step 1 is subjected to an optical alignment treatment. Here, the coating film formed on the first substrate 11 is irradiated with polarized radiation (linearly polarized light) in an oblique direction with respect to the surface of the substrate using a photomask (refer to (a) of FIG. 4). Thus, a pre-tilt angle is imparted to the liquid crystal molecules 35 in the vicinity of the first substrate 11 in advance. On the other hand, the coating film formed on the second substrate 12 is not irradiated with linearly polarized light for the alignment treatment (refer to (b) of FIG. 4). As the radiation to irradiate the coating film, for example, ultraviolet rays including light having a wavelength of 150 to 800 nm and visible light can be used. Preferably, it is ultraviolet rays containing light having a wavelength of 200 to 400 nm.

Examples of a light source used include a low-pressure mercury lamp, a high-pressure mercury lamp, a deuterium lamp, a metal halide lamp, an argon resonance lamp, a xenon lamp, an excimer laser, and the like. An irradiation amount of the radiation is preferably 400 to 50,000 J/m$^2$, and more preferably 1,000 to 20,000 J/m$^2$. After the light irradiation, a surface of the substrate may be washed with, for example, water, an organic solvent (for example, methanol, isopropyl alcohol, 1-methoxy-2-propanol acetate, butyl cellosolve, ethyl lactate, or the like) or a mixture thereof, or the substrate may be heated.

The optical alignment treatment applied to the liquid crystal alignment film (the first alignment film 22) formed on the first substrate 11 will be described with reference to FIG. 4. In FIG. 4, an alternate long and short dash line indicates one pixel, and an arrow 41 indicates an exposure orientation of polarized radiation on the coating film. A double dotted-dashed line indicates a region corresponding to the fourth domain 34. The optical alignment treatment for the first alignment film 22 is performed by a plurality of scanning steps in which the exposure orientations on the coating film are different from each other. A plurality of (specifically, four) domains having different alignment orientations is formed in one pixel by the plurality of scanning steps.

The scanning step is usually performed by scanning exposure in which the liquid crystal alignment film is irradiated with radiation while the first substrate 11 is moved with respect to the light source or the light source is moved with respect to the first substrate 11. In explaining an example of the plurality of scanning steps based on FIG. 4, first, a first exposure is performed on a region 44 corresponding to the fourth domain 34 of each of the pixels. As an example, the surface of the substrate is irradiated with radiation so that a moving direction P of the first substrate 11 relative to the light source (not shown) and a light radiation direction are made antiparallel, and the exposure orientation 41 on the substrate is −45 degrees (=315 degrees) with respect to the moving direction P (that is, the transverse direction X of the pixel 30). At this time, the first to third domains 31 to 33 are shielded from light by a light shielding member.

Subsequently, a second exposure is performed on a region corresponding to the first domain 31. The second exposure performs the same operation as that in the first exposure except that the exposure orientation 41 on the surface of the substrate is different from that of the fourth domain 34. That is, the surface of the substrate is irradiated with radiation so that the moving direction P and the light radiation direction are made antiparallel, and the exposure orientation 41 on the substrate is +45 degrees with respect to the moving direction P. At this time, the second to fourth domains 32 to 34 are shielded from light by a light shielding member. Similarly, the second domain 32 and the third domain 33 are also subjected to a third exposure and a fourth exposure, respectively, and the surfaces of the substrates thereof are irradiated with radiation so that the exposure orientations 41 on the substrate are respectively +135 degrees and −135 degrees (=225 degrees) with reference to the transverse direction X of the pixel 30.

In the scanning step, one substrate may be subjected to the scanning exposure a number of times (a total of four times in the present embodiment) corresponding to the number of alignment regions formed in one pixel. Further, it is not necessary to perform the scanning exposure on the other substrate. Therefore, the number of alignment treatments can be reduced in the manufacture of the liquid crystal display device 10. Due to such an alignment treatment, in the plurality of pixels 30 disposed in a matrix, the alignment orientations of the liquid crystal molecules have the same directions in the alignment regions adjacent to each other in the transverse direction X of the pixel 30 (refer to FIG. 4). That is, in the liquid crystal display device 10, the plurality of pixels 30 is disposed so that each of the first to fourth domains 31 to 34 is arranged in a row in the moving direction P when seen in the transverse direction X of the pixel 30. The order in which the scanning exposure is performed on the first to fourth domains 31 to 34 is not limited to the above. Further, in the case of a plurality of scanning exposures, the exposure orientation 37 may be adjusted by adjusting a polarization axis, or the exposure orientation 41 may be adjusted by changing a direction of the substrate.

<Step 3: Construction of Liquid Crystal Cell>

Subsequently, a liquid crystal cell is manufactured by disposing the liquid crystal between the two substrates disposed facing each other using the two substrates (the first substrate 11 and the second substrate 12) on which the liquid crystal alignment films are formed. When the liquid crystal cell is manufactured, for example, a method in which two substrates are disposed to face each other with a gap interposed therebetween so that the liquid crystal alignment films face each other, peripheral portions of the two substrates are bonded together with a sealing material, and liquid crystal is injected and filled into a cell gap surrounded by the surface of the substrate and the sealing material to seal an injection hole, an ODF method, or the like may be used. When the liquid crystal display device 10 is in a PSA mode, after the liquid crystal cell is constructed, the liquid crystal cell is irradiated with light in a state in which a voltage is applied between the conductive films of the pair of substrates.

Subsequently, if necessary, a polarizing plate is bonded to an outer surface of the liquid crystal cell. In this way, the liquid crystal display device 10 is obtained. Examples of the polarizing plate include a polarizing plate in which a polarizing film called an "H film" in which polyvinyl alcohol is stretch-oriented and iodine is absorbed is sandwiched between cellulose acetate protective films, and a polarizing plate made of the H film itself. In the present embodiment, the polarizing plate on the first substrate 11 side and the polarizing plate on the second substrate 12 side are disposed so that transmission axes thereof are orthogonal to each other. The transmission axis of the polarizing plate on the first substrate 11 side extends in a horizontal direction (the transverse direction of the pixel) of the display surface, and the transmission axis of the polarizing plate on the second substrate 12 side extends in a vertical direction (the longitudinal direction of the pixel) of the display surface.

The liquid crystal display device 10 can be effectively applied to various uses. The liquid crystal display device 10 can be used as various display devices such as watches, portable game consoles, word processors, laptops, car navigation systems, camcorders, PDAs, digital cameras, mobile phones, smartphones, various monitors, liquid crystal televisions, and information displays, and the like.

According to the present embodiment described above in detail, it is possible to obtain the liquid crystal display device 10 in which a plurality of alignment regions (the first to fourth domains 31 to 34) in which the alignment orientations of the liquid crystal molecules are different from each other is formed in one pixel, and the plurality of domains is arranged and disposed in the longitudinal direction of the pixel. In the liquid crystal display device 10, a plurality of pixels is arranged and disposed in the transverse direction of the pixels so that a difference in the alignment orientations of the liquid crystal molecules 35 in any two domains of the first to fourth domains 31 to 34 is approximately equal to an integral multiple of 90 degrees, and also, the alignment orientations of the liquid crystal molecules 35 in the adjacent alignment regions in the transverse direction of the pixels are the same. Further, in each of the alignment regions of the first to fourth domains 31 to 34, one of the pre-tilt angle defined by the first alignment film 22 and the pre-tilt angle defined by the second alignment film 23 is less than 90 degrees, and the other one is substantially 90 degrees. According to such a liquid crystal display device 10, the number of exposures for the alignment treatment can be reduced as compared with the case in which both the first alignment film 22 and the second alignment film 23 are dividedly exposed. Therefore, the throughput in production can be improved.

Further, in a configuration in which four alignment regions in which the alignment orientations of the liquid crystal molecules 35 are different from each other are arranged and disposed in the longitudinal direction of the pixel, assuming that the liquid crystal alignment films of both the substrates are subjected to the optical alignment treatment, there is a concern that it will be difficult to cause the boundaries of split alignment exposures to coincide with each other due to accuracy of the positioning, a distortion caused by thermal expansion of the substrate, and the like. In addition, in the case that dislocation occurs when both the substrates are bonded together, there is a concern that display defects may occur. In this regard, according to the liquid crystal display device 10 of the present embodiment, even when the dislocation of the substrates occurs when the pair of substrates are bonded together, it is possible to curb occurrence of display defects due to the dislocation.

On the other hand, in the liquid crystal display device 10, it is conceivable that a photoreaction on the surface of the alignment film occur on only one side due to the liquid crystal alignment film being irradiated with linearly polarized light only on one substrate side, and chemical surface states be different from each other. Further, the pre-tilt angle is not the same for the first alignment film 22 and the second alignment film 23, and when a voltage is applied to the liquid crystal cell, an alignment deformation of the liquid crystal is not completely point-symmetrical when seen in a normal direction the substrate. Therefore, it is conceivable that polarization due to a flexo-electric effect be generated in the liquid crystal display device 10. From these two factors, it is conceivable that even when a symmetrical AC rectangular voltage is applied to the liquid crystal cell, a DC component may be superimposed, and this cause the occurrence of flicker. In this regard, the occurrence of flicker in the liquid crystal display device 10 can be curbed by forming the liquid crystal alignment film using a liquid crystal alignment agent containing a maleimide-based polymer, and the liquid crystal display device 10 having good display quality can be obtained.

Second Embodiment

Next, a second embodiment will be described focusing on differences from the first embodiment. In the present embodiment, the heating temperature at the time of forming the liquid crystal alignment film is different between a liquid crystal alignment film which is not subjected to divided exposure and a liquid crystal alignment film which is subjected the divided exposure.

Specifically, in Step 1 described above, a difference in the post-baking temperature between the time of forming the first alignment film 22 and the time of forming the second alignment film 23 is preferably 10° C. or more, more preferably 15° C. or more, and even more preferably 20° C. or more. Further, the difference in the post-baking temperature is preferably 70° C. or less, more preferably 65° C. or less, and even more preferably 55° C. or less. At this time, a heating temperature of any one of the liquid crystal alignment film which is not subjected to the divided exposure or the liquid crystal alignment film which is subjected to the divided exposure may be set to a higher temperature.

It is preferable to select which of the liquid crystal alignment film which is not subjected to the divided exposure and the liquid crystal alignment film which is subjected to the divided exposure to have a higher heating temperature according to an alignment film material. Specifically, when specific resistance of the liquid crystal alignment film is reduced by the divided exposure, it is preferable to reduce the heating temperature of the liquid crystal alignment film which is not subjected to the divided exposure to a lower temperature. On the other hand, when the specific resistance of the liquid crystal alignment film is increased by the divided exposure, it is preferable to raise the heating temperature of the liquid crystal alignment film which is not subjected to the divided exposure to a higher temperature. Thus, it is conceivable that asymmetry of electrical properties can be reduced, and this is preferable in that the effect of curbing the occurrence of flicker can be further enhanced.

It is presumed that the reason why the specific resistance of the liquid crystal alignment film is reduced by the divided exposure is because a pathway of electron conduction such as hopping conduction is formed by a distance between aromatic rings being reduced by rearrangement of molecules in the alignment film by exposure, and the like. It is presumed that the reason why the specific resistance of the liquid crystal alignment film is increased by the divided exposure is because the rearrangement of the molecules in the alignment film promotes packing of a main chain and a side chain and thus a pathway of ion conduction is inhibited.

Here, when the pre-tilt angle defined by the liquid crystal alignment film is asymmetrical between the first alignment film 22 and the second alignment film 23, a residual DC electric field may be generated in the liquid crystal cell due to the asymmetry of the pre-tilt angle. Such a residual DC electric field may cause flicker and burn-in. On the other hand, according to the present embodiment, it is possible to curb the generation of the residual DC electric field in the liquid crystal cell and to curb the occurrence of flicker and burn-in by setting the post-baking temperature at the time of film formation to be different between the first alignment film 22 and the second alignment film 23. As a mechanism for this, it is presumed that this is due to the fact that a degree of thermochemical reaction in the alignment films can be made different from each other by making the post-baking temperature different, and the electrical properties of the first alignment film 22 and the second alignment film 23 are thus different from each other.

In the present embodiment, the first alignment film 22 and the second alignment film 23 are preferably formed using a polymer having a crosslinkable group. In this case, it is preferable that the post-baking temperature at the time of film formation is different between the first alignment film 22 and the second alignment film 23 so that the flicker curbing effect can be further enhanced. The crosslinkable group is preferably a group capable of forming a covalent bond between the same or different molecules with light or heat, and examples thereof include a (meth)acrylic-containing group having (meth)acrylic acid or a derivative thereof as a basic structure, a group having a vinyl group (an alkenyl group, a styryl group, or the like), an ethynyl group, an epoxy group (an oxiranyl group, an oxetanyl group), and the like, and an epoxy group is particularly preferable.

Third Embodiment

Next, a third embodiment will be described focusing on differences from the first embodiment and the second embodiment. In the third embodiment, the heating time for forming the liquid crystal alignment film is different between the liquid crystal alignment film which is not subjected to the divided exposure and the liquid crystal alignment film which is subjected to the divided exposure.

Specifically, in Step 1 described above, the difference in the post-baking time between the time of forming the first alignment film 22 and the time of forming the second alignment film 23 is preferably 5 minutes or more, more preferably 10 minutes or more, and even more preferably 15 minutes or more. Further, the difference in the post-baking time is preferably 60 minutes or less, more preferably 55 minutes or less, and even more preferably 50 minutes or less. At this time, the heating time of either the liquid crystal alignment film which is subjected to the divided exposure or the liquid crystal alignment film which is not subjected to the divided exposure may be shorter.

Which of the liquid crystal alignment film which is not subjected to the divided exposure and the liquid crystal alignment film which is subjected to the divided exposure has a longer heating time is preferably selected according to the alignment film material. Specifically, when the specific resistance of the liquid crystal alignment film is reduced by the divided exposure, it is preferable to shorten the heating time of the liquid crystal alignment film which is not subjected to the divided exposure. On the other hand, when the specific resistance of the liquid crystal alignment film is increased by the divided exposure, it is preferable to lengthen the heating time of the liquid crystal alignment film which is not subjected to the divided exposure. Thus, it is conceivable that the asymmetry of the electrical properties can be reduced, and this is preferable in that the effect of curbing the occurrence of flicker can be further enhanced.

According to such a third embodiment, even when the pre-tilt angle defined by the liquid crystal alignment film is asymmetrical between the first alignment film 22 side and the second alignment film 23 side, it is possible to curb generation of the residual DC electric field in the liquid crystal cell and thus to curb occurrence of flicker and burn-in by setting the post-baking time at the time of forming the liquid crystal alignment film to be different between the first alignment film 22 and the second alignment film 23.

When the liquid crystal alignment film is formed, and the heating times of the liquid crystal alignment film which is not subjected to the divided exposure and the liquid crystal alignment film which is subjected to the divided exposure are different from each other, the first alignment film 22 and the second alignment film 23 are preferably formed using a polymer having a crosslinkable group. In this case, it is preferable that the post-baking time at the time of film formation be different between the first alignment film 22 and the second alignment film 23, because the flicker curbing effect can be further enhanced. As for the description of the crosslinkable group, the description in the second embodiment applies.

Fourth Embodiment

Next, a fourth embodiment will be described focusing on differences from the first to third embodiments. In the fourth embodiment, the film thickness of the liquid crystal alignment film is different between the liquid crystal alignment film which is not subjected to the divided exposure and the liquid crystal alignment film which is subjected to the divided exposure.

Specifically, in Step 1 described above, when it is assumed that the film thickness of the liquid crystal alignment film which is not subjected to the divided exposure is D1 and the film thickness of the liquid crystal alignment film which is subjected to the divided exposure is D2, a ratio of D1/D2 is preferably 0.2 to 2.5, and more preferably 0.3 to 2.0.

It is preferable that which of the liquid crystal alignment film which is not subjected to the divided exposure and the liquid crystal alignment film which is subjected to the divided exposure to be thicker is selected according to the alignment film material. Specifically, when the specific resistance of the liquid crystal alignment film is reduced by the divided exposure, it is preferable to make the film thickness of the liquid crystal alignment film which is not subjected to the divided exposure thinner. On the other hand, when the specific resistance of the liquid crystal alignment film is increased by the divided exposure, it is preferable to make the film thickness of the liquid crystal alignment film which is not subjected to the divided exposure thicker. Thus, it is conceivable that the asymmetry of the electrical properties can be reduced, and it is preferable in that the effect of curbing the occurrence of flicker can be further enhanced.

According to such a fourth embodiment, when the pre-tilt angle defined by the liquid crystal alignment film is asymmetrical between the first alignment film 22 side and the second alignment film 23 side, it is possible to curb the generation of the residual DC electric field in the liquid crystal cell and thus to curb the occurrence of flicker and burn-in by making the film thicknesses of the first alignment film 22 and the second alignment film 23 different.

The film thicknesses of the first alignment film 22 and the second alignment film 23 may be different from each other, and at least one of the heating temperature and the heating time at the time of forming the liquid crystal alignment film may be different between the liquid crystal alignment film which is not subjected to the divided exposure and the liquid crystal alignment film which is subjected to the divided exposure. The above description applies to the description of the post-baking temperature and the post-bake time in this case.

Fifth Embodiment

Next, a fifth embodiment will be described focusing on the differences from the first to fourth embodiments. In the fifth embodiment, the occurrence of flicker in the liquid crystal display device is curbed by setting a film composition of the liquid crystal alignment film to be different between the liquid crystal alignment film which is not subjected to the divided exposure and the liquid crystal alignment film which is subjected to the divided exposure.

Specifically, when the liquid crystal alignment film (the first alignment film 22 in FIG. 1) on the side to be subjected to the divided exposure has a film composition in which the specific resistance of the alignment film is reduced by the divided exposure, a liquid crystal alignment agent used for forming the alignment film (the second alignment film 23 in FIG. 1) which is not subjected to the divided exposure has a film composition capable of forming a low resistance alignment film. Preferred examples of such a film composition include the following (1A) to (1C).

(1A) As the polymer component, at least one polymer selected from a group consisting of polyamic acid and polyamic acid ester is contained.

(1B) When the polymer components of both the liquid crystal alignment agents are the same, the blending ratio of the cross-linking agent is smaller than that in the liquid crystal alignment agent on the other side.

(1C) In a liquid crystal alignment agent of a blend type of the maleimide-based polymer and the polyamic acid, a content ratio of the polyamic acid is higher.

On the other hand, when the liquid crystal alignment film on the side to be subjected to the divided exposure has a film composition in which the specific resistance of the alignment film is increased by the divided exposure, the liquid crystal alignment agent used for forming the alignment film which is not subjected to the divided exposure has a film composition capable of forming a high resistance alignment film. Preferred examples of such a film composition include the following (2A) to (2C).

(2A) As the polymer component, at least one polymer selected from a group consisting of polyimide, polyimide, polyorganosiloxane, and a(meth) acrylic polymer is contained.

(2B) When the polymer components of both the liquid crystal alignment agents are the same, the blending ratio of the cross-linking agent is made larger than that in the liquid crystal alignment agent on the other side.

(2C) In the liquid crystal alignment agent of the blend type of the maleimide-based polymer and the polyamic acid, the content ratio of the polyamic acid is lower.

According to the present embodiment, the electrical properties of both can be brought close to each other by forming the exposed first alignment film 22 and the unexposed second alignment film 23 as heterogeneous alignment films. Thus, even when the pre-tilt angle defined by the liquid crystal alignment film is different between the first alignment film 22 and the second alignment film 23, it is possible to maintain the electrical symmetry when the liquid crystal cell is seen in the normal direction of the substrate, and also it is possible to curb the occurrence of flicker.

Sixth Embodiment

Next, a sixth embodiment will be described focusing on differences from the first to fifth embodiments. In the first embodiment, one of the first alignment film 22 and the second alignment film 23 is a liquid crystal alignment film which has been dividedly exposed, and the other is a liquid crystal alignment film which has not been dividedly exposed. On the other hand, the sixth embodiment is different from the first embodiment in that both the first alignment film 22 and the second alignment film 23 are dividedly exposed.

The optical alignment treatment performed on the coating films formed on the first substrate 11 and the second substrate 12 in the present embodiment will be described with reference to FIGS. 5 and 6.

As shown in (a) of FIG. 5, in each of the pixels 30 of the liquid crystal display device 10, a plurality of alignment regions in which the alignment orientations of the liquid crystal molecules 35 are different from each other is formed by the optical alignment treatment. In (a) of FIG. 5, a cone represents the liquid crystal molecule 35, the apex side of the cone represents the first substrate 11 side, and the bottom surface side of the cone represents the second substrate 12 side. (a) of FIG. 5 is a view of the liquid crystal display device 10 when seen from the second substrate 12 side.

Four alignment regions are formed in each of the pixels 30, and the alignment regions are the first domain 31, the second domain 32, the third domain 33, and the fourth domain 34 (refer to (a) of FIG. 5). The first to fourth domains 31 to 34 are arranged and disposed in the longitudinal direction of the pixel 30 (the Y direction in (a) to (c) of FIG. 5) in one pixel. In the first to fourth domains 31 to 34, when the transverse direction of the pixels 30 (the X direction in (a) to (c) of FIG. 5) is 0 degrees, the alignment orientations of the liquid crystal molecules 35 are set so that a difference in the alignment orientations of any two domains among the first to fourth domains 31 to 34 is approximately equal to an integral multiple of 90 degrees.

The alignment orientation of the liquid crystal molecules 35 in the liquid crystal display device 10 is substantially 45 degrees in the first domain 31, substantially 135 degrees in the second domain 32, substantially 225 degrees in the third domain 33, and substantially 315 degrees in the fourth domain 34. As shown in (a) of FIG. 5, the domains 31 to 34 are disposed in one pixel in the order of the fourth domain 34, the second domain 32, the third domain 33, and the first domain 31 in the longitudinal direction of the pixel 30. In the domains (the fourth domain 34 and the second domain 32) belonging to one region of two regions divided by the signal line 36 and the domains (the third domain 33 and the first domain 31) belonging to the other region, the alignment orientations of the liquid crystal molecules 35 are different from each other by 180 degrees.

(b) and (c) of FIG. 5 are views schematically showing the tilt orientation of one pixel 30 on each of the substrates. In (a) to (c) of FIG. 5, (b) represents the first substrate 11, and (c) represents the second substrate 12. An arrow 37 in the drawing indicates the tilt orientation. An arrow 41 in (a) and (b) of FIG. 6 indicates the exposure orientation on the substrate.

In a light transmission region (a pixel region) of each of the pixels 30, one of the two regions divided by the signal line 36 is subjected to alignment exposure on the first alignment film 22, and the other one is subjected to alignment exposure on the second alignment film 23. In the present embodiment, as shown in (a) of FIG. 6, in the alignment treatment of the first alignment films 22, the first alignment films 22 belonging to the fourth domain 34 and the second domain 32 among the first to fourth domains 31 to 34 are irradiated with polarized radiation in a direction corresponding to the alignment orientation of the liquid crystal molecule 35. Here, the exposure is performed so that the exposure orientations of the two adjacent domains (the fourth domain 34 and the second domain 32) are antiparallel to each other. The first alignment films 22 belonging to the third domain 33 and the first domain 31 are not irradiated with radiation.

In the alignment treatment of the second alignment films 23, as shown in (b) of FIG. 6, the second alignment films 23 belonging to the third domain 33 and the first domain 31 among the first to fourth domains 31 to 34 are irradiated with polarized radiation in the direction corresponding to the alignment orientation of the liquid crystal molecule 35. Here, the exposure is performed so that the exposure orientations of two adjacent domains (the third domain 33 and the first domain 31) are antiparallel to each other. The second alignment films 23 belonging to the fourth domain 34 and the second domain 32 are not irradiated.

When the liquid crystal alignment film is irradiated with light, the exposure orientations in the first to fourth domains 31 to 34 are different from each other. In some of the plurality of domains in one pixel (the fourth domain 34 and the second domain 32 in the present embodiment), as shown in (a) of FIG. 7, a pre-tilt angle θ1 defined by the first alignment film 22 is less than 90 degrees, and a pre-tilt angle θ2 defined by the second alignment film 23 is substantially 90 degrees due to such an alignment treatment. In the remaining domains (the third domain 33 and the first domain 31 in the present embodiment), as shown in (b) of FIG. 7, the pre-tilt angle θ1 defined by the alignment film 22 is substantially 90 degrees, and the pre-tilt angle θ2 defined by the second alignment film 23 is less than 90 degrees.

The pre-tilt angle defined by the liquid crystal alignment film which is subjected to the alignment exposure may be smaller than the pre-tilt angle defined by the liquid crystal alignment film which is not subjected to the alignment exposure. From the viewpoint of curbing the response delay of the liquid crystal molecule 35, it is preferably 89.0 degrees or less, more preferably 88.5 degrees or less, and even more preferably 88.0 degrees or less. Further, from the viewpoint of curbing a decrease in contrast of the liquid crystal display device 10, the pre-tilt angle defined by the liquid crystal alignment film which is subjected to the alignment exposure is preferably 81.0 degrees or more, more preferably 83.0 degrees or more, and even more preferably 84.0 degrees or more.

The optical alignment treatment for the first substrate 11 and the second substrate 12 is performed by a plurality of scanning steps in which the exposure orientations on the coating film are different from each other. As an example of the scanning step, first, a first exposure is performed on a region 44 of the first alignment film 22 corresponding to the fourth domain 34 of each of the pixels. Here, the surface of the substrate is irradiated with radiation so that the moving direction P of the first substrate 11 relative to the light source (not shown) and a light radiation direction are antiparallel to each other, and the exposure orientation 41 on the surface of the substrate is −45 degrees (=315 degrees) with respect to the moving direction P. At this time, the first to third domains 31 to 33 are shielded from light by a light shielding member.

Subsequently, a second exposure is performed on a region of the first alignment film 22 corresponding to the second domain 32. The second exposure performs the same operation as that in the first exposure except that the exposure orientation 41 on the surface of the substrate is different. That is, the surface of the substrate is irradiated with radiation so that the moving direction P and the light radiation direction are antiparallel, and the exposure orientation 41 on the surface of the substrate is +135 degrees with respect to the moving direction P. At this time, the first, third, and fourth domains 31, 33, and 34 are shielded from light by a light-shielding member. Regions of the first alignment film 22 belonging to the first domain 31 and the third domain 33 are not subjected to the exposure.

Subsequently, a third exposure is performed on the second alignment film 23. Here, a region 45 of the second alignment film 23 corresponding to the third domain 33 is subjected to the third exposure. The third exposure performs the same operation as that in the first exposure except that the exposure orientation 41 on the surface of the substrate is different. Specifically, the surface of the substrate is irradiated with radiation so that the moving direction P and the light radiation direction are antiparallel, and the exposure orientation 41 on the surface of the substrate is +45 degrees with respect to the moving direction P. At this time, the other domains are shielded from light by a light shielding member. Similarly, a fourth exposure is performed on the first domain 31, and the surface of the substrate is irradiated with radiation so that the exposure orientation 41 on the surface of the substrate is −135 (=225 degrees) degrees. Regions of the second alignment film 23 belonging to the fourth domain 34 and the second domain 32 are not subjected to the exposure.

In this liquid crystal display mode, a pair of substrates may be subjected to the scanning exposure a number of times (a total of four times in this embodiment) corresponding to the number of alignment regions formed in one pixel. Therefore, it is possible to obtain the liquid crystal display device 10 having the different pre-tilt angles between the first substrate 11 and the second substrate 12 while the number of exposures is reduced as much as possible. Due to such an alignment treatment, the plurality of pixels 30 is disposed in the liquid crystal display device 10 so that each of the first to fourth domains 31 to 34 is disposed to be arranged in a row in the moving direction P when seen in the transverse direction X of the pixel 30. The order in which the scanning exposure is performed on the first to fourth domains 31 to 34 is not limited to the above.

According to the liquid crystal display device 10 of the present embodiment, the number of exposures for the alignment treatment of the liquid crystal alignment film can be reduced, and the throughput in production can be improved. In addition, since there is only one boundary for alignment division in one pixel, even when the substrates are bonded together and the dislocation of the substrate (for example, dislocation of about 3 μm) occurs, it is possible to curb the occurrence of display defects due to the dislocation.

Further, in the liquid crystal display device 10, the first alignment film 22 is subjected to the alignment exposure for two alignment regions of the four alignment regions in one pixel, and the second alignment film 23 is subjected to the alignment exposure for the remaining two alignment regions. That is, each of the pixels 30 has a region in which directions of asymmetry in one pixel are opposite to each other. In this case, in an alignment region in which the first substrate 11 side is subjected to the exposure and an alignment region in which the second substrate 12 side is subjected to the exposure, flicker occurs in the waveforms having phases opposite to each other, and as a result, the display quality can be improved while the number of exposures is reduced. Further, it is possible to reduce an after-image at the time of a liquid crystal response and alignment disorder caused by an external stress on a panel by defining the alignments of both the substrates in the pixel region of the pixel 30 as shown in FIGS. 10 to 13.

In the sixth embodiment, the composition of the liquid crystal alignment agent used for forming the first alignment film 22 and the second alignment film 23 is not particularly limited. Therefore, instead of a configuration in which the first alignment film 22 and the second alignment film 23 are formed using the maleimide-based polymer, the first alignment film 22 and the second alignment film 23 may be formed using a polymer different from the maleimide-based polymer. Examples of the polymer include polyamic acid, polyimide, polyamic acid ester, polyamide, polyorganosiloxane, a (meth) acrylic polymer, and the like.

Seventh Embodiment

Next, a seventh embodiment will be described. In the present embodiment, the occurrence of the flicker and the DC deviation are curbed by forming the optical alignment film using a polymer having an optical alignment group in the side chain (hereinafter, also referred to as a "photosensitive polymer") and setting a content (a content of the photosensitive side chains) of the optical alignment group of the photosensitive polymer in the side chain to less than 1.1 mmol/g. The description of the above embodiment is applied to the configuration of the liquid crystal display device.

A main chain of the photosensitive polymer is preferably at least one selected from a group consisting of polyamic acid, polyimide, polyamic acid ester, a maleimide polymer, polyamide, polyorganosiloxane, and a (meth) acrylic polymer from the viewpoint of affinity with the liquid crystal, mechanical strength, and the like. Among them, at least one selected from a group consisting of polyamic acid, polyimide, polyamic acid ester and a maleimide-based polymer is preferable because it has a high effect of curbing the occurrence of flicker and improving the DC deviation. The above description applies to specific examples of the optical alignment group contained in the photosensitive polymer.

A content of the photosensitive side chains of the photosensitive polymer is preferably 1.0 mmol/g or less, and more preferably 0.95 mmol/g or less from the viewpoint of improving the effect of curbing the occurrence of flicker and improving the DC deviation in the liquid crystal display device. The content of the photosensitive side chains of the photosensitive polymer is preferably 0.1 mmol/g or more, and more preferably 0.2 mmol/g or more from the viewpoint of imparting the desired pre-tilt angle characteristics to the coating film due to light radiation.

The liquid crystal alignment agent may contain only the photosensitive polymer as a polymer component, and may contain a polymer different from the photosensitive polymer (that is, a polymer having no optical alignment group in the side chain) together with the photosensitive polymer. Examples of the polymer different from the photosensitive polymer include polyamic acid, polyimide, polyamic acid ester, a maleimide-based polymer, polyamide, polyorganosiloxane, and a (meth) acrylic-based polymer. Among them, at least one selected from a group consisting of polyamic acid, polyamic acid ester and polyimide is preferable. A content ratio of the photosensitive polymer in the liquid crystal alignment agent is preferably 1% by mass or more, more preferably 3% by mass or more, and even more preferably 5% by mass or more with respect to the total amount of the polymer components. As the photosensitive polymer, one type may be used alone, or two or more types may be used in combination.

Here, the DC deviation occurs due to a potential difference between the substrate which is subjected to the optical alignment treatment and the facing substrate, and the flicker occurs on the display surface due to the DC deviation. There may be multiple factors in the generation of the potential difference due to the optical alignment treatment on one substrate, and as one factor, it is conceivable that physical properties in the vicinity of the surface of the alignment film change due to the optical alignment treatment in proportion to the content of the photosensitive side chains, and the DC deviation is affected. Focusing on these points, it is possible to curb the DC deviation while improving the throughput in production by setting the content of the photosensitive side chains in the photosensitive polymer within the above-described range.

Other Embodiments

The present disclosure is not limited to the above-described embodiments, and may be implemented as follows, for example.

In the second to fourth embodiments, instead of forming the first alignment film 22 and the second alignment film 23 using the maleimide-based polymer, the first alignment film 22 and the second alignment film 23 may be formed using a polymer different from the maleimide-based polymer. Examples of the polymer include polyamic acid, polyimide, polyamic acid ester, polyamide, polyorganosiloxane, a (meth) acrylic polymer, and the like.

In each of the above-described first to fifth embodiments, any one of (1) the liquid crystal alignment film is formed using a maleimide-based polymer, (2) the heating temperature at the time of forming the liquid crystal alignment film is made different between the first alignment film 22 and the second alignment film 23, (3) the heating time at the time of forming the liquid crystal alignment film is made different between the first alignment film 22 and the second alignment film 23, (4) the film thickness of the liquid crystal alignment film is made different between the first alignment film 22 and the second alignment film 23, and (5) the film composition of the liquid crystal alignment film is made different between the first alignment film 22 and the second alignment film 23 was used as a means for reducing the asymmetry of the electrical characteristics of the alignment film due to a difference in the exposure mode with respect to the alignment film, but at least two or more of (1) to (5) may be combined. For example, the heating temperature at the time of forming the liquid crystal alignment film may be made different between the liquid crystal alignment film which is not subjected to the divided exposure and the liquid crystal alignment film which is subjected to the divided exposure, and the heating time at the time of forming the liquid crystal alignment film may be made different between the liquid crystal alignment film which is not subjected to the divided exposure and the liquid crystal alignment film which is subjected to the divided exposure. Alternatively, both the film composition and the film thickness of the liquid crystal alignment film may be different between the first alignment film 22 and the second alignment film 23.

In the first to fifth embodiments, the alignment orientation of the liquid crystal molecule 35 is not limited to the mode shown in (a) to (c) of FIG. 2. The alignment orientation of the liquid crystal molecule 35 may have, for example, a mode shown in FIGS. 8 and 9. In FIGS. 8 and 9, (a) shows the alignment orientation of the liquid crystal molecule 35 in one pixel, (b) shows the tilt orientation on the TFT substrate side, and (c) shows the tilt orientation on the CF substrate side. A reference numeral 37 represents a tilt orientation when a voltage is off.

In the example shown in (a) to (c) of FIG. 8, the fourth domain 34, the first domain 31, the third domain 33, and the second domain 32 are formed in the pixel 30 in this order in the longitudinal direction of the pixel 30. In the example of (a) to (c) of FIG. 8, the alignment orientations of the liquid crystal molecules 35 are different from each other by 90 degrees in the two domains (the fourth domain 34 and the first domain 31) forming one of the two regions divided by the signal line 36 and the two domains (the third domain 33 and the second domain 32) forming the other region. Therefore, in the case of a moving image response, it is preferable in that a deformation of the liquid crystal alignment orientation at the boundary portion of the alignment orientation is small, an alignment delay of the liquid crystal molecule 35 is reduced, and moving image display performance can be improved.

In the example shown in (a) to (c) of FIG. 9, the fourth domain 34, the first domain 31, the second domain 32, and the third domain 33 are formed in this order in the longitudinal direction of the pixel 30. In the example of (a) to (c) of FIG. 9, the alignment orientations of the liquid crystal molecules 35 in the two adjacent domains are different by 90 degrees. Therefore, in the case of the moving image response, the alignment delay of the liquid crystal molecule 35 can be further reduced.

In the above-described sixth embodiment, the alignment orientations of the liquid crystal molecules 35 are not limited to the mode shown in (a) to (c) of FIG. 5. The alignment orientations of the liquid crystal molecules 35 may have, for example, the mode shown in FIGS. 10 to 13. (a), (b) and (c) of FIGS. 10 to 13 are the same as those in FIGS. 8 and 9.

In the example shown in (a) to (c) of FIG. 10, the fourth domain 34, the first domain 31, the third domain 33, and the second domain 32 are formed in this order in the longitudinal direction of the pixel 30. Similar to (a) to (c) of FIG. 8, the example of (a) to (c) of FIG. 10 is also preferable because it has a high effect of reducing the alignment delay of the liquid crystal molecule 35 in the case of the moving image response. In the example shown in (a) to (c) of FIG. 11, as in the example of (a) to (c) of FIG. 9, since the alignment orientations of the liquid crystal molecules 35 in the two adjacent domains are different by 90 degrees, the alignment delay of the liquid crystal molecules 35 can be further reduced in the case of the moving image response. Further, in the examples of (a) of FIG. 10 to (c) of FIG. 13, since a difference in the exposure orientation between the TFT substrate and the CF substrate during two exposures is 90 degrees, it is not necessary to invert the substrate during the exposures, which contributes to the improvement of the throughput in production. Especially in the example shown in FIG. 13, the four domains are arranged in the pixel region on the TFT substrate side in the order of tilt alignment, 90 degree alignment, tilt alignment, and 90 degree alignment, and are arranged in the pixel region on the CF substrate side in the order of 90 degree alignment, tilt alignment, 90 degree alignment, and tilt alignment. Therefore, in both the first substrate 11 and the second substrate 12, there are boundaries which define the entire domains, and it is possible to further reduce the afterimage during the liquid crystal response and the alignment disorder caused by the external stress on the panel.

In the above-described first to fifth embodiments, the pre-tilt angle θ1 defined by the first alignment film 22 is set to less than 90 degrees, and the pre-tilt angle θ2 defined by the second alignment film 23 is set to substantially 90 degrees, but the pre-tilt angle θ2 defined by the second alignment film 23 may be less than 90 degrees, and the pre-tilt angle θ1 defined by the first alignment film 22 may be substantially 90 degrees.

In the above-described first to seventh embodiments, the configuration in which the solid electrode having no opening portion (slit) is used as the pixel electrode 15 has been described, but an electrode having a slit may be used. A shape of the slit is not particularly limited, and as shown in FIG. 14, for example, a slit 38 extending in an oblique direction with respect to each of sides of the pixel 30 may be formed on the entire surface of the pixel region, or a slit may be formed only in a part of the pixel region (for example, a boundary portion between two adjacent domains, or one outer edge portion of the pixel 30 in the transverse direction X in each of the domains). When the pixel electrode 15 is a slit electrode, it is preferable that a longitudinal direction of the slit 38 and a direction in which the alignment orientation of the liquid crystal molecule 35 in the alignment region in which the slit 38 is located is projected onto the TFT substrate are approximately parallel to each other. In the configuration in which the optical alignment treatment for the liquid crystal alignment film is performed on only one of the first alignment film 22 and the second alignment film 23, stabilization of the liquid crystal alignment can be promoted by an oblique electric field generated in the slit 38. It is preferable that a length of an electrode portion (that is, an electrode width) and a length of the opening portion in the slit electrode are about the same as a thickness of the liquid crystal cell. Specifically, it is preferable that the length of the electrode part and the length of the opening portion (that is, the slit width) are 2 to 4 μm. Furthermore, from the viewpoint of increasing light transmittance of the liquid crystal display device, it is preferable that an electrode width (L) is L<1.1d and a slit width (S) is S<d with respect to a thickness (a cell gap, d) of the liquid crystal layer, it is more preferable that L<d and S<d, and it is even more preferable that L<d and (d/2)<S<d.

Here, a factor of the change in the electrode width (L) and slit width (S) of the slit electrode change according to a change of the cell gap (d) which is preferable from the viewpoint of the transmittance of the liquid crystal display device is that the oblique electric field generated between the electrodes according to a slit structure affects driving of the liquid crystal. Focusing on this point, an appropriate oblique electric field can be obtained in a liquid crystal display device having the slit electrode by setting the electrode width L, the slit width S, and the cell gap d of the slit electrode to satisfy the above relationship, and a liquid crystal display device having excellent transmittance characteristics can be obtained.

In the liquid crystal display device manufactured by the alignment division due to the optical alignment method, a liquid crystal display device having high transmittance can be obtained by setting the pre-tilt angle on one substrate side to less than 90 degrees, setting the pre-tilt angle on the other substrate side to substantially 90 degrees and setting the electrode width (L) to L<1.1d and the slit width (S) to S<d with respect to the thickness (d) of the liquid crystal layer.

In the above-described first to seventh embodiments, the liquid crystal layer 13 may contain a chiral agent. It is possible to curb generation of dark lines in the pixel region and to obtain a liquid crystal display device having improved transmittance characteristics by adding a chiral agent to the liquid crystal having a negative dielectric anisotropy and forming the liquid crystal layer 13. The chiral agent is not particularly limited, and known ones can be used. Examples of the chiral agent used include S-811, R-811, CB-15 (all manufactured by Merck & Co., Inc.), and the like. An amount of the chiral agent added is, for example, 0.1 to 10% by mass with respect to the total amount of the liquid crystal having the negative dielectric anisotropy. Due to the liquid crystal layer 13 containing the chiral agent, the liquid crystal molecules in the liquid crystal layer 13 are twistedly aligned between the first substrate 11 and the second substrate 12 in a state in which a voltage is applied. At this time, the exposure orientation of each of the liquid crystal domains is set so that twisting directions of the liquid crystal molecules are the same direction among the plurality of liquid crystal domains. A twist angle of the liquid crystal molecules when a voltage is applied to the liquid crystal layer 13 is preferably set in a range of 60 to 120 degrees.

EXAMPLES

Hereinafter, embodiments will be described based on examples, but the present disclosure is not limitedly interpreted by the following examples.

In the following examples, a weight average molecular weight Mw and a number average molecular weight Mn of a polymer, a solution viscosity and an epoxy equivalent weight of a polymer solution, and an imidization ratio of polyimide were measured by the following methods. Required amounts of raw material compounds and polymers used in the following examples were secured by repeating synthesis on a synthetic scale shown in the following synthesis examples as necessary.

[Chem. 4]

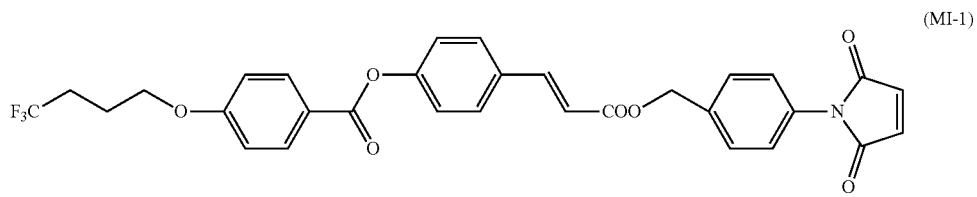

(MI-1)

[Weight Average Molecular Weight Mw and Number Average Molecular Weight Mn]

The weight average molecular weight Mw and the number average molecular weight Mn are polystyrene-equivalent values measured by GPC under the following conditions.
Column: made by Tosoh Corporation, TSKgelGRCXLII
Solvent: tetrahydrofuran
Temperature: 40° C.
Pressure: 68 kgf/cm$^2$

[Solution Viscosity of Polymer Solution]

The solution viscosity (mPa·s) of the polymer solution was measured at 25° C. using an E-type rotational viscometer.

[Imidization Rate]

A solution containing polyimide was put into pure water, an obtained precipitate was sufficiently dried under reduced pressure at room temperature and was dissolved in deuterated dimethyl sulfoxide, and $^1$H-NMR was measured at room temperature using tetramethylsilane as a reference substance. From the obtained $^1$H-NMR spectrum, the imidization ratio was determined using the following Equation (EX-1).

Imidization rate (%)=(1−$A^1$/$A^2$×α)×100  (EX-1)

(In Equation (EX-1), $A^1$ is a peak area derived from protons of a NH group appearing near a chemical shift of 10 ppm, $A^2$ is a peak area derived from other protons, and a is a ratio of the number of other protons to one proton of the NH group in a precursor (polyamic acid) of the polymer.)

[Epoxy Equivalent Value]

An epoxy equivalent value was measured by a hydrochloric acid-methylethylketone method described in JIS C 2105.

Polymer Synthesis

Synthesis Example 1

5.00 g (8.6 mmol) of a compound represented by the following formula (MI-1), 0.64 g (4.3 mmol) of 4-vinylbenzoic acid, 2.82 g (13.0 mmol) of 4-(2,5-dioxo-3-pyroline-1-yl) benzoic acid, 3.29 g (17.2 mmol) of 4-(glycidyloxymethyl) styrene, 0.31 g (1.3 mmol) of 2,2'-azobis (2,4-dimethylvaleronitrile) as a radical polymerization initiator, 0.52 g (2.2 mmol) of 2,4-diphenyl-4-methyl-1-pentene as a chain transfer agent, and 25 ml of tetrahydrofuran as a solvent were added in a 100 mL two-neck flask under nitrogen and were polymerized at 70° C. for 5 hours. After reprecipitation in n-hexane, a precipitate thereof was filtered and vacuum-dried at room temperature for 8 hours to obtain a styrene-maleimide-based polymer (referred to as a "polymer (PM-1)"). A weight average molecular weight Mw measured by GPC in terms of polystyrene was 30,000, and a molecular weight distribution Mw/Mn was 2. An amount of the photosensitive side chain of the polymer (PM-1) is 0.73 mmol/g.

Synthesis Example 2

13.8 g (70.0 mmol) of 1,2,3,4-cyclobutanetetracarboxylic acid dianhydride and 16.3 g (76.9 mmol) of 2,2'-dimethyl-4,4'-diaminobiphenyl were dissolved in 170 g of N-methyl-2-pyrrolidone (NMP), and a reaction was carried out at 25° C. for 3 hours to obtain a solution containing 10% by mass of polyamic acid. The polyamic acid solution was then poured into a large excess of methanol to precipitate a reaction product. The obtained precipitate was washed with methanol and dried under reduced pressure at 40° C. for 15 hours to obtain polyamic acid (referred to as a "polymer (PAA-1)").

Synthesis Example 3

21.81 g (0.0973 mol) of 2,3,5-tricarboxycyclopentylacetatic acid dianhydride, 19.29 g (0.0390 mol) of 5-cholestane-3-yl 2,4-diaminophenyl ether, and 8.90 g (0.0585 mol) of 3,5-diaminobenzoic acid were dissolved in 200 g of N-methyl-2-pyrrolidone, and a reaction was carried out at 60° C. for 5 hours. A viscosity of this polymerization solution was measured and found to be 1450 mPa·s. Then, 250 g of N-methyl-2-pyrrolidone was added to this solution, and a mixture thereof was stirred for a while, then 11.55 g of pyridine and 14.90 g of acetic anhydride were added, and dehydration and ring-closure were carried out at 110° C. for 4 hours. A reaction mixture thereof was then poured into a large excess of methanol to precipitate a reaction product. The precipitate was washed with methanol and dried under reduced pressure at 40° C. for 15 hours to obtain 37.5 g of polyimide having an imidization ratio of 69% (referred to as a "polymer (PI-1)").

Synthesis Example 4

100.0 g of 2-(3,4-epoxycyclohexyl) ethyltrimethoxysilane, 500 g of methyl isobutyl ketone, and 10.0 g of triethylamine were charged and mixed at room temperature in a reaction vessel equipped with a stirrer, a thermometer, a dropping funnel and a reflux condenser. Then, 100 g of deionized water was added dropwise from the dropping funnel over 30 minutes, and then reacted at 80° C. for 6 hours while mixing under reflux. After the reaction is complete, an organic layer is taken out and washed with 0.2% by weight of ammonium nitrate aqueous solution until the water after washing becomes neutral, then the solvent and water are distilled off under reduced pressure, and thus polyorganosiloxane (EPS-1) having an epoxy group was obtained as a viscous transparent liquid. The weight average molecular weight Mw of the obtained polyorganosiloxane (EPS-1) was 2,200, and the epoxy equivalent value was 186 g/mol.

Then, 30.1 g of polyorganosiloxane (EPS-1), 140 g of methyl isobutyl ketone, 31.9 g of cinnamic acid derivative (A-1) represented by the following formula (A-1) (corresponding to 50 mol % with respect to silicon atoms of the polyorganosiloxane (EPS-1)), 4.60 g of stearic acid (corresponding to 10 mol % with respect to silicon atoms of the polyorganosiloxane (EPS-1)), 0.0686 g of 3,5-dinitrobenzoic acid (corresponding to 0.2 mol % with respect to the silicon atom of polyorganosiloxane (EPS-1)), and 3.00 g of tetrabutylammonium bromide were charged in a 300 mL three-neck flask, and a reaction therebetween was carried out at 80° C. for 5 hours with stirring. After completion of the reaction, reprecipitation was carried out with methanol, and a precipitate thereof was dissolved in ethyl acetate to obtain a solution. As a radiation-sensitive polyorganosiloxane, 55.6 g of a white powder of a polymer (S-1) having a weight average molecular weight (Mw) of 12,600 (Mw/Mn=1.42) was obtained by washing the obtained solution with water 5 times and then distilling off the solvent. An amount of the photosensitive side chain of the polymer (S-1) was 1.24 mmol/g.

[Chem. 5]

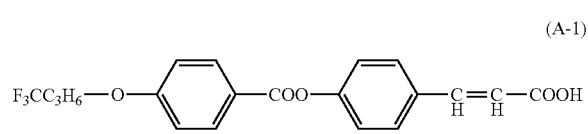

(A-1)

Synthesis Example 5

18.75 g (0.0836 mol) of 2,3,5-tricarboxycyclopentylacetatic acid dianhydride, 7.359 g (0.0681 mol) of p-phenylenediamine as a diamine compound, and 8.895 g (0.0170 mol) of 3,5-diaminobenzoic acid=5-cholestane-3-yl represented by the above formula (p3) were dissolved in 140 g of N-methyl-2-pyrrolidone, and a reaction thereof was carried out at 60° C. for 5 hours. A viscosity of this polymerization solution was measured and found to be 2000 mPa·s. Then, 325 g of N-methyl-2-pyrrolidone was added to this solution and was stirred for a while, then 6.61 g of pyridine and 8.54 g of acetic anhydride were added, and dehydration and ring-closure were carried out at 110° C. for 4 hours. A reaction solution thereof was then poured into a large excess of methyl alcohol to precipitate a reaction product. A precipitate thereof was washed with methanol and dried under reduced pressure at 40° C. for 15 hours to obtain 26.6 g of polyimide having an imidization ratio of 51% (referred to as a "polymer (PI-2)").

Synthesis Example 6

27.07 g (0.121 mol) of 2,3,5-tricarboxycyclopentylacetatic acid dianhydride, 66.79 g (0.109 mol) of 6-{[((2E)-3-{4-[(4-(3,3,3-trifluoropropoxy) benzoyl) oxy] phenyl}propa-2-enoyl) oxy]}hexyl-3,5-diaminobenzoate, 2.99 g (0.00604 mol) of 5-cholestane-3-yl 2,4-diaminophenyl ether, and 3.16 g (0.00604 mol) of 3,5-diaminobenzoic acid=5-cholestane-3-yl were dissolved in 185.7 g of N-methyl-2-pyrrolidone, and a reaction thereof was carried out at 60° C. for 24 hours. A viscosity of this polymerization solution was measured and found to be 2100 mPa·s. A reaction mixture thereof was then poured into a large excess of methanol to precipitate a reaction product. A precipitate thereof was washed with methanol and dried under reduced pressure at 40° C. for 15 hours to obtain 68 g of polyamic acid (referred to as a "polymer (PAA-2)"). An amount of the photosensitive side chain of the polymer (PM-1) was 1.12 mmol/g.

Synthesis Example 7

4.21 g (0.0188 mol) of 2,3,5-tricarboxycyclopentylacetatic dianhydride, 9.23 g (0.0158 mol) of a compound represented by the following formula (DA-1), and 1.56 g (0.0030 mol) of 3,5-diaminobenzoic acid cholestanyl were dissolved in 135 g of N-methyl-2-pyrrolidone, and a reaction thereof was carried out at 60° C. for 6 hours. A viscosity of this polymerization solution was measured and found to be 19 mPa·s. 150 g of a solution containing 10% by mass of polyamic acid (referred to as a "polymer (PAA-3)") was obtained. An amount of the photosensitive side chain of the polymer (PAA-3) was 1.05 mmol/g.

[Chem. 6]

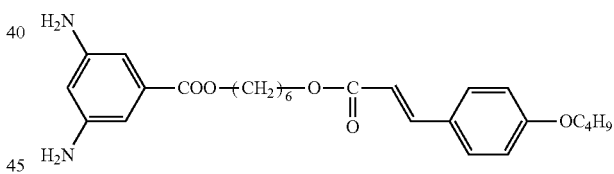

(DA-1)

Synthesis Example 8

4.27 g (0.0190 mol) of 2,3,5-tricarboxycyclopentylacetatic acid dianhydride, 7.43 g (0.0127 mol) of a compound represented by the above formula (DA-1), and 3.30 g (0.0063 mol) of 3,5-diaminobenzoic acid cholestanyl were dissolved in 135 g of N-methyl-2-pyrrolidone, and a reaction thereof was carried out at 60° C. for 6 hours. A viscosity of this polymerization solution was measured and found to be 21 mPa·s. 150 g of a solution containing 10% by mass of polyamic acid (referred to as a "polymer (PAA-4)") was obtained. An amount of the photosensitive side chain of the polymer (PAA-4) was 0.85 mmol/g.

Example 1

1. Preparation of Liquid Crystal Alignment Agent

NMP and butyl cellosolve (BC) were added as solvents to 10 parts by mass of the polymer (PM-1) and 100 parts by mass of the polymer (PAA-1), and a solution having a solvent composition of NMP/BC=50/50 (a mass ratio) and a solid content concentration of 4.0% by mass was prepared. A liquid crystal alignment agent (AL-1) was prepared by filtering this solution through a filter having a pore size of 1 µm.

2. Manufacture of Liquid Crystal Display

The liquid crystal display device 10 corresponding to FIG. 1 was manufactured. First, a TFT substrate and a CF substrate were prepared. A solid electrode having no slit was used as a pixel electrode of the TFT substrate and a counter electrode of the CF substrate. The liquid crystal alignment agent (AL-1) was applied to each of the electrode arrangement surfaces of the TFT substrate and the CF substrate by a spin cast method. This was prebaked at 80° C. for 1 minute and then post-baked at 230° C. for 40 minutes so that a final film thickness thereof was 120 nm. Subsequently, the scanning exposure was performed on the coating film (the liquid crystal alignment film) formed on the TFT substrate. According to (a) and (b) of FIG. 4, in the scanning exposure, linearly polarized light at 313 nm was performed four times in total with an intensity of 20 mJ/cm$^2$ so that four domains in which the alignment orientations of the liquid crystal molecules were different from each other were formed in one pixel. On the other hand, the liquid crystal alignment film formed on the CF substrate using the liquid crystal alignment agent (AL-1) was not subjected to the exposure.

Subsequently, a nematic liquid crystal having a negative dielectric anisotropy was dropped on the surface of the TFT substrate on which the liquid crystal alignment film is formed, and a thermosetting epoxy resin was disposed as a sealing material on an outer edge portion of the CF substrate. After that, the TFT substrate and the CF substrate were bonded so that the alignment film surfaces were located inward. Subsequently, the epoxy resin was cured by heating at 130° C. for 1 hour to obtain a liquid crystal cell. A pre-tilt angle of the obtained liquid crystal cell was 88.0 degrees on the TFT substrate side and 90.0 degrees on the CF substrate side. The pre-tilt angle is a value measured using OPTI-Pro manufactured by Shintec Co., Ltd. (hereinafter, the same applies).

3. Evaluation of Occurrence of Flicker

A degree of occurrence of flicker was evaluated using the liquid crystal cell manufactured in 2 described above. The evaluation was performed by visually observing the flicker when a rectangular wave electric field having a frequency of 60 Hz and an applied voltage of 3 V was applied to the liquid crystal cell at 25° C. As a result, the flicker was not visually observed in the liquid crystal display device of Example 1, and the display characteristics were good.

4. Evaluation of DC Deviation

A rectangular wave electric field having a frequency of 60 Hz and an applied voltage of 10 V was applied to the liquid crystal cell manufactured in 2 described above at 25° C. for 72 hours. After that, a DC voltage was applied in a state in which it is driven by a rectangular wave voltage having a frequency of 60 Hz and an applied voltage of 3 V, and a DC voltage at which the flicker could not be confirmed was evaluated as a DC deviation in the cell. When the DC deviation was less than 400 mV, it was determined as "good", when the DC deviation was 400 mV or more and less than 500 mV, it was determined as "OK", and when the DC deviation was 500 mV or more, it was determined as "defective". As a result, this example had a small DC deviation and was evaluated as "good".

When an electrode with a slit (the slit electrode) was used as the pixel electrode in Example 1, the same effect as in Example 1 was confirmed. In the slit electrode used, an electrode widths (L) between adjacent slits, a slit width (S), and a cell gap (d) were L=3.0 µm, S=3.0 µm, and d=3.2 µm, respectively.

Comparative Example 1

The liquid crystal alignment film was formed on the TFT substrate and the CF substrate using the liquid crystal alignment agent (AL-1) in the same manner as in Example 1 except that the alignment treatment shown in (a) to (c) of FIG. 15 was performed on the liquid crystal alignment film formed on the CF substrate by the scanning exposure, and the liquid crystal display device shown in FIG. 1 was manufactured. In (a) to (c) of FIG. 15, (a) represents the alignment orientation of the liquid crystal molecule in each of the alignment regions when a voltage is applied, (b) represents the exposure orientation when the TFT substrate is seen from the alignment film side, and (C) represents the exposure orientation when the CF substrate is seen from the side opposite to the alignment film forming surface (that is, a back surface side of the CF substrate). In Comparative example 1, the TFT substrate was subjected to the scanning exposures four times, and the CF substrate was subjected to the scanning exposures four times, for a total of eight scanning exposures. Moreover, the occurrence of flicker and the DC deviation were evaluated using the obtained liquid crystal cell in the same manner as in Example 1.

In Comparative example 1, it is necessary to perform the scanning exposure eight times in total to obtain a liquid crystal display device, and the throughput in production is inferior to that in Example 1. Further, in the case that the dislocation (for example, about 3 µm) occurs when the pair of substrates are bonded together, in Comparative Example 1, a display defect occurs due to an alignment defect which occurs at a boundary portion of the alignment division. On the other hand, in Example 1, even when the dislocation occurs between the substrates when the substrates are bonded together, it is possible to curb the display defect due to the dislocation. Further, in the liquid crystal display device of Comparative Example 1, the flicker is more likely to occur than that of Example 1, and the display quality is inferior. In addition, the DC deviation was evaluated as "defective".

Comparative Example 2

A liquid crystal alignment agent was prepared using a polyamic acid (the polyamic acid (PA-1) having an optical alignment group in the side chain and a polyamic acid (OPA-2) having no optical alignment group in the side chain) as the polymer component according to the description in paragraph 0080 of Japanese Patent Laid-Open No. 2011-158835 (Example 1). A liquid crystal cell was manufactured in the same manner as in Example 1 described above except that the polyamic acid-based liquid crystal alignment agent was used, and the degree of the occurrence of flicker and the DC deviation were evaluated using the obtained liquid crystal cell. As a result, flicker was clearly confirmed in the liquid crystal display device of Comparative example 2. In addition, the DC deviation was evaluated as "defective". An amount of the photosensitive side chain of the polyamic acid (PA-1) used in Comparative example 2 was 1.18 mmol/g.

Comparative Example 3

A liquid crystal cell was manufactured in the same manner as in Example 1 except that the composition of the liquid crystal alignment agent forming the liquid crystal alignment films (the first alignment film and the second alignment film) was changed. Moreover, the degree of the occurrence of flicker and the DC deviation were evaluated using the obtained liquid crystal cell. In Comparative example 3, (AF-1) shown below was used instead of (AL-1) as the liquid crystal alignment agent.

Preparation of Liquid Crystal Alignment Agent (AF-1)

10 parts by mass of the polymer (S-1), NMP, and butyl cellosolve (BC) were added to 30 parts by mass of the polymer (PAA-1) and 70 parts by mass of the polymer (PI-1) so that a solvent composition was NMP:BC=45:55 (mass ratio), and a solution having a solid content concentration of 3.5% by mass was prepared. A liquid crystal alignment agent (AF-1) was prepared by filtering this solution through a filter having a pore size of 0.2 μm.

While the flicker is not visually recognized in the liquid crystal display device of Example 1, the flicker is clearly confirmed in the liquid crystal display device of Comparative example 3, and the display quality was inferior. In addition, the DC deviation was evaluated as "defective".

Example 2

A liquid crystal cell was manufactured in the same manner as in Example 1 except that the liquid crystal alignment film on the TFT substrate side was manufactured using the liquid crystal alignment agent (AF-1) to have a film thickness of 120 nm under conditions of a post-baking temperature of 230° C. and a post-baking time of 40 minutes, and the liquid crystal alignment film on the CF substrate side was manufactured using the liquid crystal alignment agent (AF-2) shown below to have a film thickness of 120 nm under conditions of a post-baking temperature of 200° C. and a post-baking time of 40 minutes. Moreover, the degree of the occurrence of flicker and the DC deviation were evaluated in the same manner as in Example 1 using the obtained liquid crystal cell.

Preparation of Liquid Crystal Alignment Agent (AF-2)

NMP and butyl cellosolve (BC) were added to the polymer (PI-2) so that a solvent composition was NMP:BC=45:55 (a mass ratio), and a solution having a solid content concentration of 3.5% by mass was prepared. A liquid crystal alignment agent (AF-2) was prepared by filtering this solution through a filter having a pore size of 0.2 μm.

While the flicker is visually recognized in the liquid crystal display device of Comparative example 2, the flicker was almost invisible in the liquid crystal display device of Example 2, and the display quality could be improved. The evaluation of DC deviation was "OK". Further, even when an electrode with a slit was used as the pixel electrode in Example 2, the same effect as in Example 2 was confirmed.

Example 3

A liquid crystal cell was manufactured in the same manner as in Example 1 except that the liquid crystal alignment film on the TFT substrate side was manufactured using the liquid crystal alignment agent (AF-1) to have a film thickness of 120 nm under conditions of a post-baking temperature of 230° C. and a post-baking time of 40 minutes and the liquid crystal alignment film on the CF substrate side was manufactured using the liquid crystal alignment agent (AF-1) to have a film thickness of 120 nm under the conditions of a post-baking temperature of 200° C. and a post-baking time of 40 minutes. Moreover, the degree of the occurrence of flicker and the DC deviation were evaluated in the same manner as in Example 1 using the obtained liquid crystal cell. As a result, in the liquid crystal display device of Example 3, the flicker was almost invisible, and the display quality could be improved. In addition, the evaluation of DC deviation was "OK".

Even when an electrode with a slit was used as the pixel electrode in Example 3, the same effect as in Example 3 was confirmed.

Example 4

A liquid crystal cell was manufactured in the same manner as in Example 1 except that the liquid crystal alignment film on the TFT substrate side was manufactured using the liquid crystal alignment agent (AF-1) to have a film thickness of 120 nm under conditions of a post-baking temperature of 230° C. and a post-baking time of 40 minutes and the liquid crystal alignment film on the CF substrate side was manufactured using the liquid crystal alignment agent (AF-1) to have a film thickness of 120 nm under conditions of a post-baking temperature of 230° C. and a post-baking time of 20 minutes. Moreover, the degree of the occurrence of flicker and the DC deviation were evaluated in the same manner as in Example 1 using the obtained liquid crystal cell. As a result, in the liquid crystal display device of Example 4, the flicker was almost invisible, and the display quality could be improved. In addition, the evaluation of DC deviation was "OK".

Even when an electrode with a slit was used as the pixel electrode in Example 4, the same effect as in Example 4 was confirmed.

Example 5

A liquid crystal cell was manufactured in the same manner as in Example 1 except that the liquid crystal alignment film on the TFT substrate side was manufactured using the liquid crystal alignment agent (AF-1) to have a film thickness of 120 nm under conditions of a post-baking temperature of 230° C. and a post-baking time of 40 minutes, and the liquid crystal alignment film on the CF substrate side was manufactured using the liquid crystal alignment agent (AF-1) to have a film thickness of 80 nm under conditions of a post-baking temperature of 230° C. and a post-baking time of 40 minutes. Moreover, the degree of the occurrence of flicker and the DC deviation were evaluated in the same manner as in Example 1 using the obtained liquid crystal cell. As a result, in the liquid crystal display device of Example 5, the flicker was almost invisible, and the display quality could be improved. The evaluation of DC deviation was "OK".

Even when an electrode with a slit was used as the pixel electrode in Example 5, the same effect as in Example 5 was confirmed.

Example 6

A liquid crystal cell corresponding to the sixth embodiment was manufactured by performing the same operation as in Example 1 except that the liquid crystal alignment films of the TFT substrate and the CF substrate were manufactured using the liquid crystal alignment agent (AF-1) instead of the liquid crystal alignment agent (AL-1), and each of the coating films formed on the TFT substrate and the CF substrate was subjected to the scanning exposures two times in the exposure orientations shown in FIG. 6.

In Example 6, the number of scanning exposures for obtaining the liquid crystal display device is only four times in total. Therefore, the throughput in production is improved as compared with Comparative example 1. Further, since the boundary portion of the alignment division within one pixel is three places in Comparative example 1 whereas there is one place in Example 6, even if a dislocation of the substrates (for example, about 3 μm) occurs when the substrates are bonded together, display defects due to the dislocation can be curbed. Further, due to an auxiliary capacitance line being disposed in the center of the pixel, the boundary portion at one place can be hidden by wiring, and display defects can be further curbed. Further, in the liquid crystal display device of Example 6, the visible flicker can be significantly curbed, and the display quality is improved. It is presumed that this is because two sets of domains having a pre-tilt angle of less than 90 degrees on the TFT substrate side and two sets of domains having a pre-tilt angle of less than 90 degrees on the CF substrate side generate flicker with waveforms having phases opposite to each other. The evaluation of DC deviation was "OK".

The same operations and evaluations as in Example 6 were performed except that the first alignment film and the second alignment film were manufactured with the liquid crystal alignment agent (AL-1), and the same effects as in Example 6 could be confirmed.

Further, the first alignment film and the second alignment film were manufactured using a polyamic acid-based polymer composition (a composition containing a polymer (PAA-2) instead of the polymer (PI-2) in the liquid crystal alignment agent (AF-2)) as the liquid crystal alignment agent, the same operations and evaluations as in Example 6 were performed, and the same effect as in Example 6 was confirmed.

<Evaluation of Content of the Photosensitive Side Chains>

Example 7

1. Preparation of Liquid Crystal Alignment Agent

A solution containing the polyamic acid (PAA-3) obtained in Synthesis example 7 and a solution containing the polyamic acid (PAA-1) obtained in Synthesis example 2 were mixed as a polymer so that polyamic acid (PAA-3):polyamic acid (PAA-1)=20:80 (mass ratio). γ-butyrolactone (BL), N-methyl-2-pyrrolidone (NMP) and diethylene glycol diethyl ether (DEDG) were added thereto and were thoroughly stirred, and a solution having a solvent composition of BL:NMP:DEDG=30:20:50 (a mass ratio) and a solid content concentration of 3% by mass was prepared. A liquid crystal alignment agent (AL-2) was prepared by filtering this solution using a filter having a pore size of 1 μm.

2. Manufacture and Evaluation of Liquid Crystal Display Device

A liquid crystal cell was manufactured in the same manner as in Example 1 above except that the liquid crystal alignment agent (AL-2) was used, and the degree of the occurrence of flicker and the DC deviation were evaluated using the obtained liquid crystal cell. As a result, in the liquid crystal display device of Example 7, the flicker was almost invisible, and the display quality could be improved. In addition, the DC deviation was evaluated as "good".

Example 8

1. Preparation of Liquid Crystal Alignment Agent

A solution containing the polyamic acid (PAA-4) obtained in Synthesis Example 8 and a solution containing the polyamic acid (PAA-1) obtained in Synthesis Example 2 were mixed as a polymer so that polyamic acid (PAA-4):polyamic acid (PAA-1)=20:80 (mass ratio), γ-butyrolactone (BL), N-methyl-2-pyrrolidone (NMP) and diethylene glycol diethyl ether (DEDG) were added thereto and were thoroughly stirred, and a solution having a solvent composition of BL:NMP:DEDG=30:20:50 (a mass ratio) and a solid content concentration of 3% by mass was prepared. A liquid crystal alignment agent (AL-3) was prepared by filtering this solution using a filter having a pore size of 1 μm.

2. Manufacture and Evaluation of Liquid Crystal Display Device

A liquid crystal cell was manufactured in the same manner as in Example 1 described above except that the liquid crystal alignment agent (AL-3) was used, and the degree of the occurrence of flicker and the DC deviation were evaluated using the obtained liquid crystal cell. As a result, the flicker was not visually recognized in the liquid crystal display device of Example 8, and the display quality could be improved. In addition, the DC deviation was evaluated as "good".

In Example 7 using a polyamic acid having a content of the photosensitive side chains of 1.05 mmol/g, and Example 8 using a polyamic acid having a content of the photosensitive side chains of 0.85 mmol/g, the occurrence of flicker was curbed, and the DC deviation was also small. On the other hand, the flicker was clearly confirmed in Comparative example 2 using a polyamic acid (PA-1) in which the type of monomer used for the polymerization is the same as that of the polymer (PAA-3) and the polymer (PAA-4) and has a high content of the photosensitive side chains of 1.18 mmol/g. Further, the evaluation of DC deviation was also "defective".

<Evaluation of Transmittance>

Examples 1, 8 and 9 and Comparative Examples 4 to 9

A liquid crystal display device is manufactured in the same manner as in Example 1 except that, in the liquid crystal display device of Example 1, the pixel electrode was used as a slit electrode, and the conditions of the electrode width (L), the slit width (S), and the cell gap (d) of the pixel electrode were changed as shown in Table 1 below, and an effect on the transmittance was investigated. The transmittance was calculated by simulation using an Expert LCD manufactured by LinkGlobal21. As calculation conditions, liquid crystal physical characteristics: $\Delta\varepsilon=3$, $Ne=1.6$, $No=1.5$, cell gap: 3.2 μm or 2.9 μm, pre-tilt angle: measured value (the TFT substrate side: 88.0 degrees, and the CF substrate side: 90.0 degrees) were applied, and the transmittance characteristics were evaluated from the result of the applied voltage of 6 V. At this time, when the transmittance was less than 0.275, it was evaluated as "Δ", when it was 0.275 or more and less than 0.280, it was evaluated as "O", and when it was 0.280 or more, it was evaluated as "⊙". The evaluation results of the transmittance are shown in Table 1 below.

TABLE 1

|  | L/S on TFT side (µm) | d (µm) | Transmittance | Evaluation |
|---|---|---|---|---|
| Example 1 (with slit) | 3.0/3.0 | 3.2 | 0.280 | ⊙ |
| Example 9 | 2.5/2.5 | 3.2 | 0.281 | ⊙ |
| Comparative example 4 | 3.5/2.5 | 3.2 | 0.277 | O |
| Comparative example 5 | 2.5/3.5 | 3.2 | 0.277 | O |
| Comparative example 6 | 3.5/1.5 | 3.2 | 0.266 | Δ |
| Comparative example 10 | 2.5/2.5 | 2.9 | 0.280 | ⊙ |
| Comparative example 7 | 3.5/2.5 | 2.9 | 0.275 | O |
| Comparative example 8 | 2.5/3.5 | 2.9 | 0.269 | Δ |
| Comparative example 9 | 3.0/3.0 | 2.9 | 0.274 | Δ |

As shown in Table 1, in Examples 1, 9 and 10 in which L was smaller than d and S was smaller than d, the transmittance was higher than that in Comparative examples 4 to 9, and good transmittance characteristics were exhibited.

<Evaluation of Addition of Chiral Agent>

Example 11

1. Manufacture of Liquid Crystal Display Device

A liquid crystal display device was manufactured in the same manner as in Example 1 except that, in the liquid crystal display device of Example 1, the pixel electrode was used as a slit electrode, the electrode width (L) of the pixel electrode was 3.5 µm, the slit width (S) was 2.5 µm, and the cell gap (d) was 3.2 µm, and a chiral agent (product name "S-811" manufactured by Merck & Co., Inc.) was added to a nematic liquid crystal having a negative dielectric anisotropy. At this time, an amount of the chiral agent added was adjusted so that the chiral pitch was 12.8 µm.

2. Evaluation of Transmittance Characteristics

The transmittance of the liquid crystal display device manufactured in 1 described above was calculated by simulation using the Expert LCD manufactured by LinkGlobal21. As calculation conditions, liquid crystal physical characteristics: Δε=3, Δn=0.178, cell gap: 3.2 µm, and pre-tilt angle: 88.0° were applied, and the transmittance characteristics were evaluated from the results of the applied voltage of 6 V. When the transmittance was less than 0.275, it was evaluated as "A", when it was 0.275 or more and less than 0.280, it was evaluated as "O", and when it was 0.280 or more, it was evaluated as "⊙". The results are shown in Table 2 below.

Comparative Example 10

A liquid crystal display device was manufactured in the same manner as in Example 11 except that, in the liquid crystal display device of Example 11, a chiral agent was not added to the nematic liquid crystal having a negative dielectric anisotropy. In addition, the transmittance of the manufactured liquid crystal display device was calculated by simulation. As calculation conditions, liquid crystal physical characteristics: Δε=3, Δn=0.100, cell gap: 3.2 µm, pre-tilt angle: 88.0° were applied, and the transmittance characteristics were evaluated from the results of the applied voltage of 6 V. The results are shown in Table 2 below.

Example 12

A liquid crystal display device was manufactured in the same manner as in Example 1 except that, in the liquid crystal display device (the pixel electrode: solid electrode) of Example 1, a chiral agent (product name "S-811" manufactured by Merck & Co., Inc.) was added to a nematic liquid crystal having a negative dielectric anisotropy. At this time, the amount of the chiral agent added was adjusted so that a chiral pitch was 12.8 µm. In addition, the transmittance of the manufactured liquid crystal display device was calculated by simulation. As calculation conditions, liquid crystal physical characteristics: Δε=3 and Δn=0.147, cell gap: 3.2 µm, and pre-tilt angle: 88.0° were applied, and the transmittance characteristics were evaluated from the results of the applied voltage of 6 V. The results are shown in Table 2 below.

Comparative Example 11

A liquid crystal display device was manufactured in the same manner as in Example 12 except that, in the liquid crystal display device of Example 12, a chiral agent was not added to the nematic liquid crystal having a negative dielectric anisotropy. In addition, the transmittance of the manufactured liquid crystal display device was calculated by simulation. As calculation conditions, liquid crystal physical characteristics: Δε=3 and Δn=0.100, cell gap: 3.2 µm, and pre-tilt angle: 88.0° were applied, and the transmittance characteristics were evaluated from the results of the applied voltage of 6 V. The results are shown in Table 2 below.

TABLE 2

|  | L/S on TFT side (µm) | d(µm) | dΔn | Chiral pitch (µm) | Transmittance | Evaluation |
|---|---|---|---|---|---|---|
| Example 11 | 3.5/2.5 | 3.2 | 570 | 12.8 | 0.307 | ⊙ |
| Comparative example 10 | 3.5/2.5 | 3.2 | 320 | — | 0.277 | O |
| Example 12 | — | 3.2 | 470 | 12.8 | 0.285 | ⊙ |
| Comparative example 11 | — | 3.2 | 320 | — | 0.257 | Δ |

As shown in Table 2, in Examples 11 and 12 in which the chiral agent was added to the liquid crystal having a negative dielectric anisotropy, the high transmittance was exhibited as compared with Comparative Examples 10 and 11 in which the chiral agent was not added. From the results, it was clarified that the transmittance characteristics can be improved by adding the chiral agent to the liquid crystal having a negative dielectric anisotropy.

The invention claimed is:

1. A liquid crystal display device having a plurality of pixels, comprising:
   a first substrate;
   a second substrate configured to face the first substrate;
   a liquid crystal layer provided between the first substrate and the second substrate and configured to contain liquid crystal molecules;
   a first alignment film formed on the first substrate and configured to align the liquid crystal molecules; and
   a second alignment film formed on the second substrate and configured to align the liquid crystal molecules,
   wherein at least one of the first alignment film and the second alignment film is an optical alignment film,
   each of the pixels in the plurality of pixels has a first alignment region, a second alignment region, a third alignment region, and a fourth alignment region as regions in which alignment orientations of the liquid crystal molecules are different from each other, and the first alignment region, the second alignment region, the third alignment region, and the fourth alignment region are arranged and disposed in a longitudinal direction of the pixel, a difference between any two alignment orientations among the alignment orientation of the first alignment region, the alignment orientation of the second alignment region, the alignment orientation of the third alignment region, and the alignment orientation of the fourth alignment region is approximately equal to an integral multiple of 90 degrees, the plurality of pixels is arranged and disposed in a transverse direction of the pixels so that the alignment orientations of the alignment regions adjacent to each other in the transverse direction of the pixel are the same, in each of the first to fourth alignment regions, one of a pre-tilt angle defined by the first alignment film and a pre-tilt angle defined by the second alignment film is less than 90 degrees, and the other is substantially 90 degrees, the optical alignment film is formed using a polymer having an optical alignment group in a side chain, and a content of the optical alignment group in the side chain of the polymer is less than 1.1 mmol/g.

2. The liquid crystal display device according to claim 1, wherein the polymer is a polymer having a structural unit derived from a maleimide compound.

3. A liquid crystal display device having a plurality of pixels, comprising:

a first substrate;

a second substrate configured to face the first substrate;

a liquid crystal layer provided between the first substrate and the second substrate and configured to contain liquid crystal molecules;

a first alignment film formed on the first substrate and configured to align the liquid crystal molecules; and a second alignment film formed on the second substrate and configured to align the liquid crystal molecules, wherein at least one of the first alignment film and the second alignment film is an optical alignment film, each of the pixels in the plurality of pixels has a first alignment region, a second alignment region, a third alignment region, and a fourth alignment region as regions in which alignment orientations of the liquid crystal molecules are different from each other, and the first alignment region, the second alignment region, the third alignment region, and the fourth alignment region are arranged and disposed in a longitudinal direction of the pixel, a difference between any two alignment orientations among the alignment orientation of the first alignment region, the alignment orientation of the second alignment region, the alignment orientation of the third alignment region, and the alignment orientation of the fourth alignment region is approximately equal to an integral multiple of 90 degrees, the plurality of pixels is arranged and disposed in a transverse direction of the pixels so that the alignment orientations of the alignment regions adjacent to each other in the transverse direction of the pixels are the same, in each of the first to fourth alignment regions, one of a pre-tilt angle defined by the first alignment film and a pre-tilt angle defined by the second alignment film is less than 90 degrees, and the other is substantially 90 degrees, and at least one of the first alignment film and the second alignment film is formed by using a polymer having a structural unit derived from a maleimide compound.

4. The liquid crystal display device according to claim 1, wherein one of the first alignment film and the second alignment film is an optical alignment film which is dividedly exposed, and the other is not dividedly exposed.

5. The liquid crystal display device according to claim 4, wherein film compositions of the first alignment film and the second alignment film are different from each other.

6. The liquid crystal display device according to claim 4, wherein film thicknesses of the first alignment film and the second alignment film are different from each other.

7. The liquid crystal display device according to claim 1, wherein the first alignment film and the second alignment film are optical alignment films, and in some of the alignment regions of the first to fourth alignment regions, the pre-tilt angle defined by the first alignment film is less than 90 degrees, and the pre-tilt angle defined by the second alignment film is substantially 90 degrees, and in the remaining alignment regions, the pre-tilt angle defined by the first alignment film is substantially 90 degrees, and the pre-tilt angle defined by the second alignment film is less than 90 degrees.

8. A liquid crystal display device having a plurality of pixels, comprising:

a first substrate;

a second substrate configured to face the first substrate;

a liquid crystal layer provided between the first substrate and the second substrate and configured to contain liquid crystal molecules;

a first alignment film formed on the first substrate and configured to align the liquid crystal molecules; and a second alignment film formed on the second substrate and configured to align the liquid crystal molecules, wherein the first alignment film and the second alignment film are optical alignment films, each of the pixels in the plurality of pixels has a first alignment region, a second alignment region, a third alignment region, and a fourth alignment region as regions in which alignment orientations of the liquid crystal molecules are different from each other, and the first alignment region, the second alignment region, the third alignment region, and the fourth alignment region are arranged and disposed in a longitudinal direction of the pixel, a difference between any two alignment orientations among the alignment orientation of the first alignment region, the alignment orientation of the second alignment region, the alignment orientation of the third alignment region, and the alignment orientation of the fourth alignment region is approximately equal to an integral multiple of 90 degrees, the plurality of pixels is arranged and disposed in a transverse direction of the pixels so that the alignment orientations of the alignment regions adjacent to each other in the transverse direction of the pixels are the same, and in some of the alignment regions of the first to fourth alignment regions, a pre-tilt angle defined by a first portion of the first alignment film, which is subjected to an alignment exposure, is less than 90 degrees, a pre-tilt angle defined by a first portion of the second alignment film, which is not subjected to the alignment exposure, is substantially 90 degrees, and in the remaining alignment regions, the pre-tilt angle defined by a second portion of the first alignment film, which is not subjected to the alignment exposure, is substantially 90 degrees, and the pre-tilt angle defined by a second portion of the second alignment film, which is subjected to the alignment exposure, is less than 90 degrees.

9. A liquid crystal display device having a plurality of pixels, comprising:
a first substrate;
a second substrate configured to face the first substrate;
a liquid crystal layer provided between the first substrate and the second substrate and configured to contain liquid crystal molecules;
a first alignment film formed on the first substrate and configured to align the liquid crystal molecules; and
a second alignment film formed on the second substrate and configured to align the liquid crystal molecules,
wherein at least one of the first alignment film and the second alignment film is an optical alignment film,
each of the pixels in the plurality of pixels has a first alignment region, a second alignment region, a third alignment region, and a fourth alignment region as regions in which alignment orientations of the liquid crystal molecules are different from each other, and the first alignment region, the second alignment region, the third alignment region, and the fourth alignment region are arranged and disposed in a longitudinal direction of the pixel,
a difference between any two alignment orientations among the alignment orientation of the first alignment region, the alignment orientation of the second alignment region, the alignment orientation of the third alignment region, and the alignment orientation of the fourth alignment region is approximately equal to an integral multiple of 90 degrees,
the plurality of pixels is arranged and disposed in a transverse direction of the pixels so that the alignment orientations of the alignment regions adjacent to each other in the transverse direction of the pixels are the same,
in each of the first to fourth alignment regions, one of a pre-tilt angle defined by the first alignment film and a pre-tilt angle defined by the second alignment film is less than 90 degrees, and the other is substantially 90 degrees,
one of the first substrate and the second substrate has a pixel electrode having a plurality of slits extending in an oblique direction with respect to each side of the pixel, and
when an electrode width of the pixel electrode is L, a slit width of the pixel electrode is S, and a thickness of the liquid crystal layer is d,
wherein L<d and (d/2)<S<d.

10. The liquid crystal display device according to claim 1, wherein the liquid crystal layer contains a chiral agent.

11. The liquid crystal display device according to claim 1, wherein one of the first substrate and the second substrate has a pixel electrode having an opening portion formed therein, and a longitudinal direction of the opening portion and a direction in which the alignment orientation of the alignment region in which the opening portion is located is projected onto the substrate having the pixel electrode are approximately parallel to each other.

12. A method for manufacturing a liquid crystal display device having a plurality of pixels, the liquid crystal display device comprising:
a first substrate;
a second substrate configured to face the first substrate;
a liquid crystal layer provided between the first substrate and the second substrate and configured to contain liquid crystal molecules;
a first alignment film formed on the first substrate and configured to align the liquid crystal molecules; and
a second alignment film formed on the second substrate and configured to align the liquid crystal molecules,
wherein the first alignment film and the second alignment film are formed by applying a polymer composition on the substrates and heating the substrates, and at least one of the first alignment film and the second alignment film is an optical alignment film,
each of the pixels in the plurality of pixels is formed to have a first alignment region, a second alignment region, a third alignment region, and a fourth alignment region as regions in which alignment orientations of the liquid crystal molecules are different from each other, and the first alignment region, the second alignment region, the third alignment region, and the fourth alignment region are arranged and disposed in a longitudinal direction of the pixel,
a difference between any two alignment orientations among the alignment orientation of the first alignment region, the alignment orientation of the second alignment region, the alignment orientation of the third alignment region, and the alignment orientation of the fourth alignment region is approximately equal to an integral multiple of 90 degrees,
the plurality of pixels is arranged and disposed in a transverse direction of the pixels so that the alignment orientations of the alignment regions adjacent to each other in the transverse direction of the pixels are the same,
in each of the first to fourth alignment regions, one of a pre-tilt angle defined by the first alignment film and a pre-tilt angle defined by the second alignment film is less than 90 degrees, and the other is substantially 90 degrees, and
at least one of a heating temperature when the first alignment film and the second alignment film are formed, a heating time when the first alignment film and the second alignment film are formed, and film compositions of the first alignment film and the second alignment film is made different between the first alignment film and the second alignment film.

* * * * *